(12) United States Patent
Kikuchi

(10) Patent No.: US 11,156,811 B2
(45) Date of Patent: Oct. 26, 2021

(54) ZOOM LENS AND IMAGE PICKUP APPARATUS

(71) Applicant: CANON KABUSHIKI KAISHA, Tokyo (JP)

(72) Inventor: Shohei Kikuchi, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 80 days.

(21) Appl. No.: 16/679,066

(22) Filed: Nov. 8, 2019

(65) Prior Publication Data

US 2020/0174235 A1    Jun. 4, 2020

(30) Foreign Application Priority Data

Nov. 29, 2018   (JP) .............................. JP2018-224122

(51) Int. Cl.
   *G02B 15/14* (2006.01)
   *G02B 15/173* (2006.01)
   *G03B 19/02* (2021.01)

(52) U.S. Cl.
   CPC . *G02B 15/143105* (2019.08); *G02B 15/1461* (2019.08); *G02B 15/145105* (2019.08); *G02B 15/173* (2013.01); *G03B 19/02* (2013.01)

(58) Field of Classification Search
   CPC .... G02B 15/145105; G02B 15/145113; G02B 15/145121; G02B 15/145129; G02B 15/1461
   See application file for complete search history.

(56) References Cited

U.S. PATENT DOCUMENTS

2016/0025955 A1* 1/2016 Ito ........................... G02B 15/16
                                                              359/557
2016/0033748 A1* 2/2016 Fujisaki ......... G02B 15/144105
                                                              348/294

FOREIGN PATENT DOCUMENTS

JP          2017-156428 A        9/2017

* cited by examiner

*Primary Examiner* — Darryl J Collins

(74) *Attorney, Agent, or Firm* — Canon U.S.A., Inc. IP Division

(57) ABSTRACT

A zoom lens includes an N-1-th lens unit disposed second closest to the image side and an N-th lens unit disposed closest to the image side. The N-1-th lens unit and the N-th lens unit each includes a cemented lens, and move at zooming. For at least one of the N-1-th lens unit and the N-th lens unit, the relationship between the radius of curvature of a cemented surface of the cemented lens and the distance from the cemented surface to an image plane, the value of the larger amount of the amount of movement of the N-1-th lens unit and the amount of movement of the N-th lens unit at zooming from the wide-angle end to the telephoto end, the overall lens length at the wide-angle end, the focal length of the zoom lens at the wide-angle end, and a back focus at the wide-angle end are determined.

20 Claims, 26 Drawing Sheets

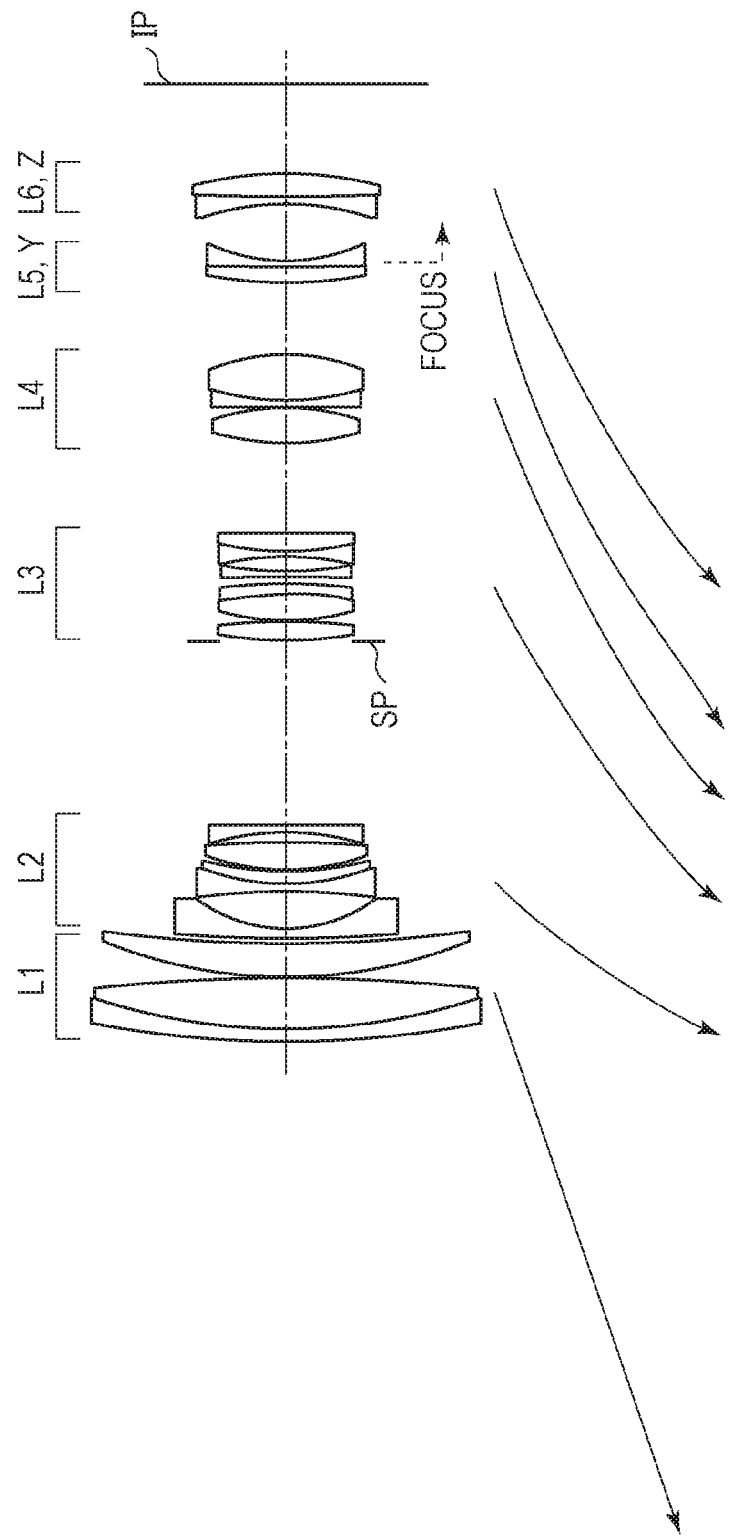

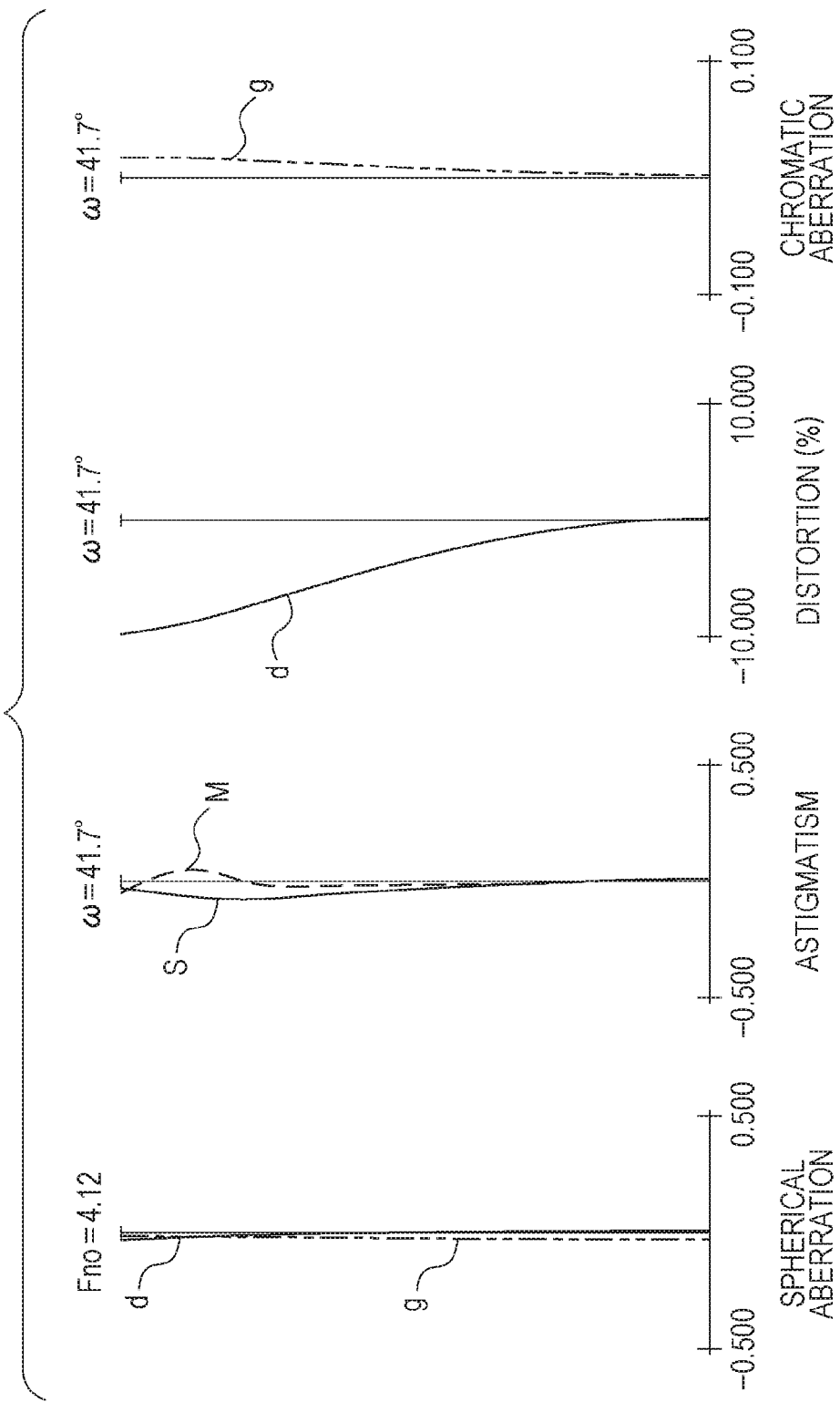

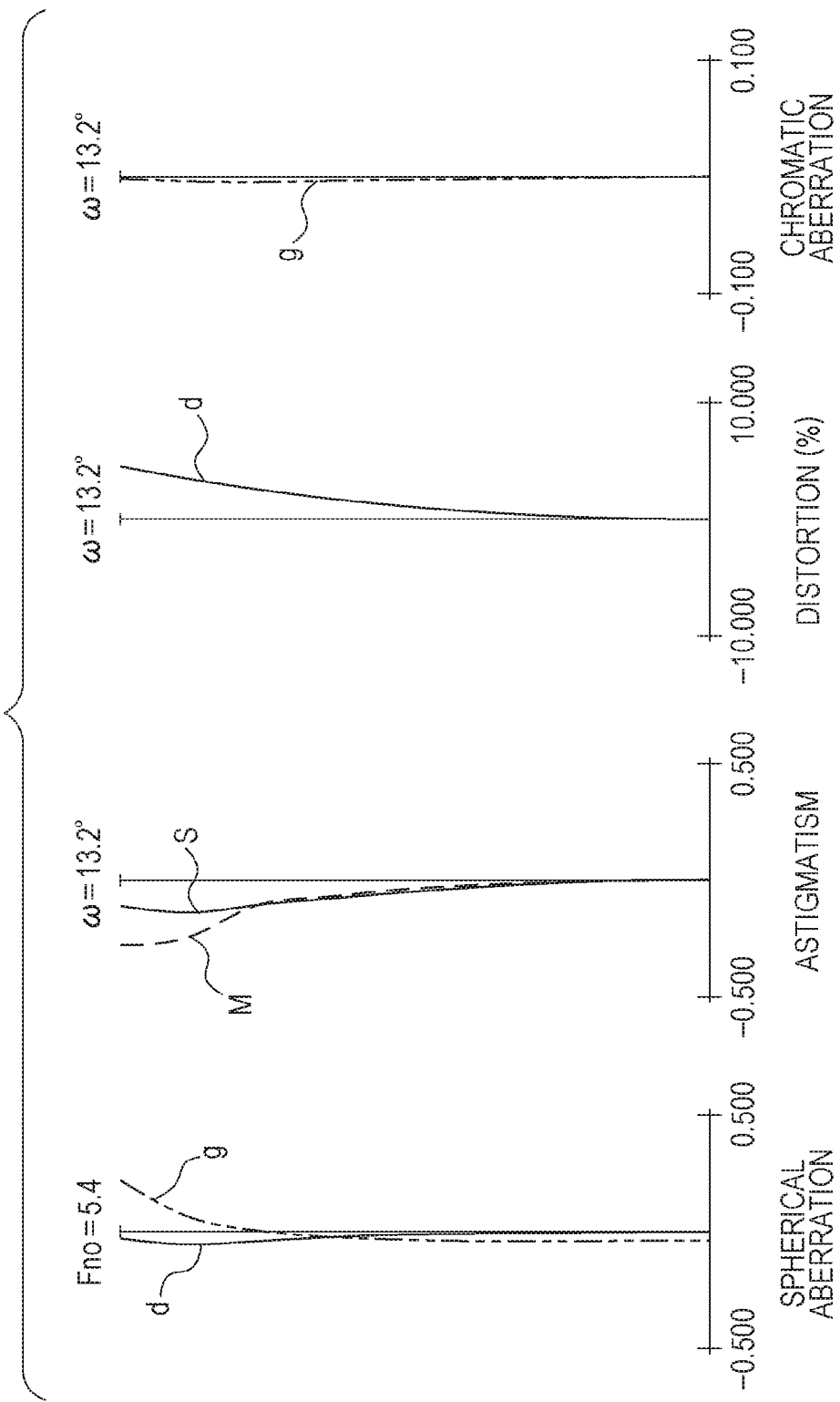

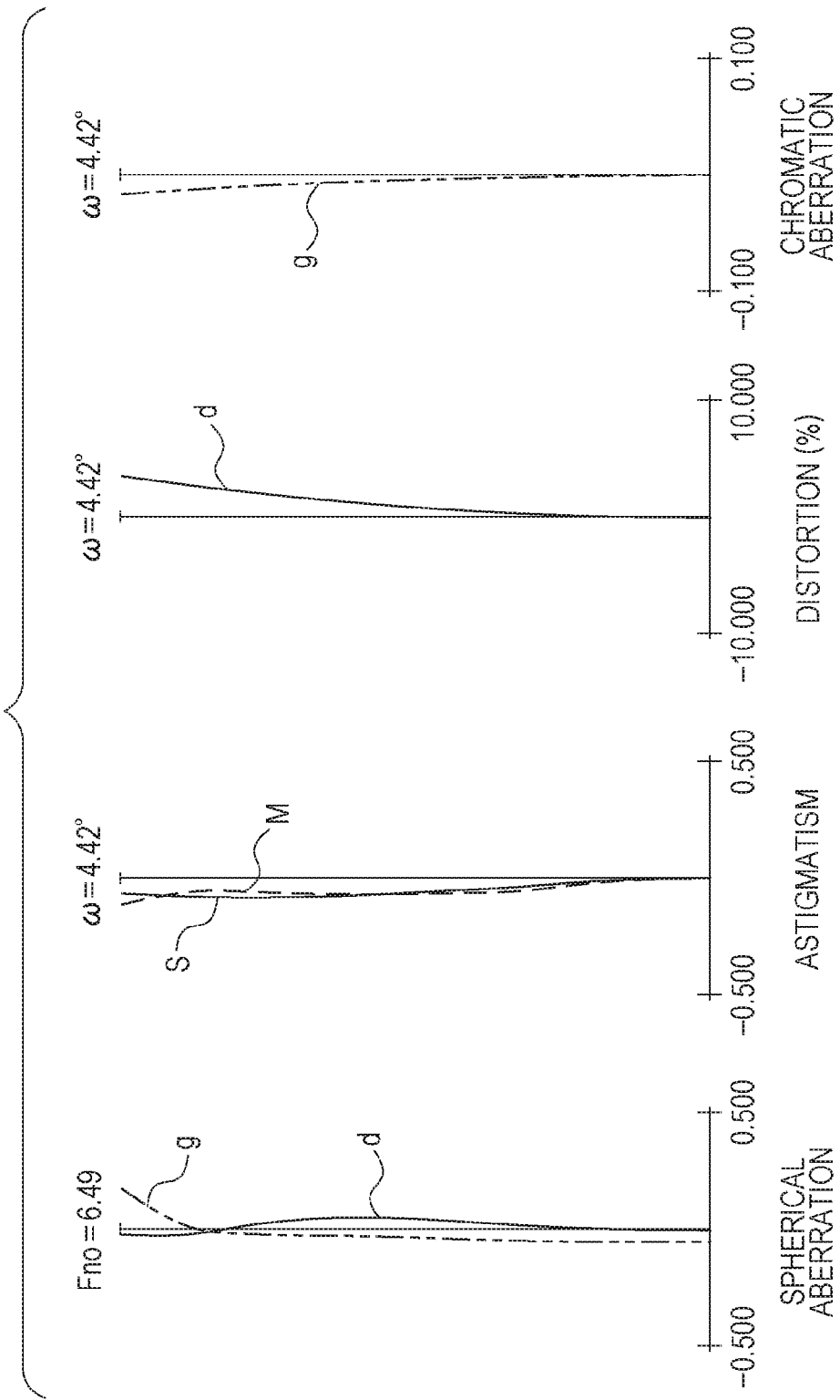

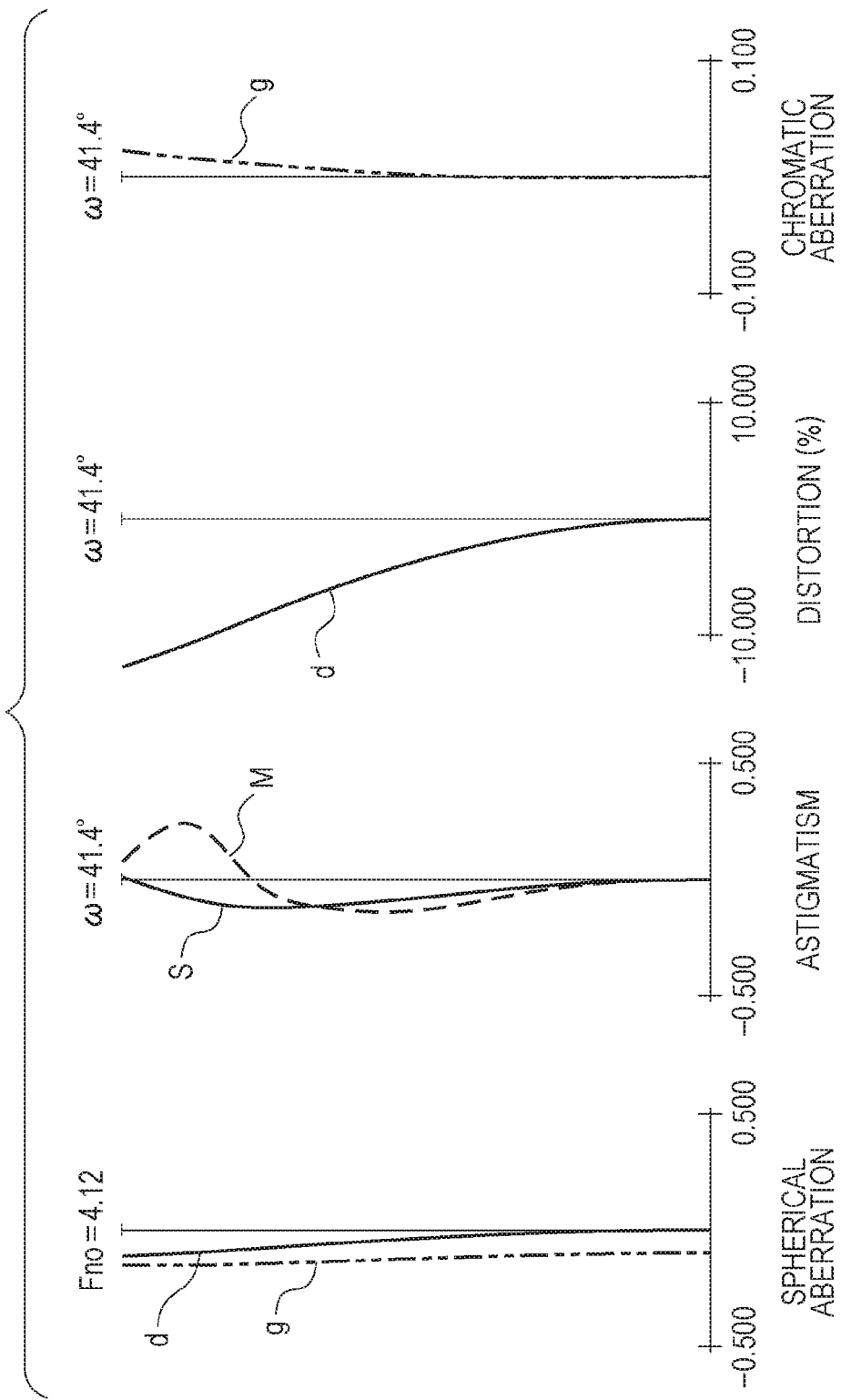

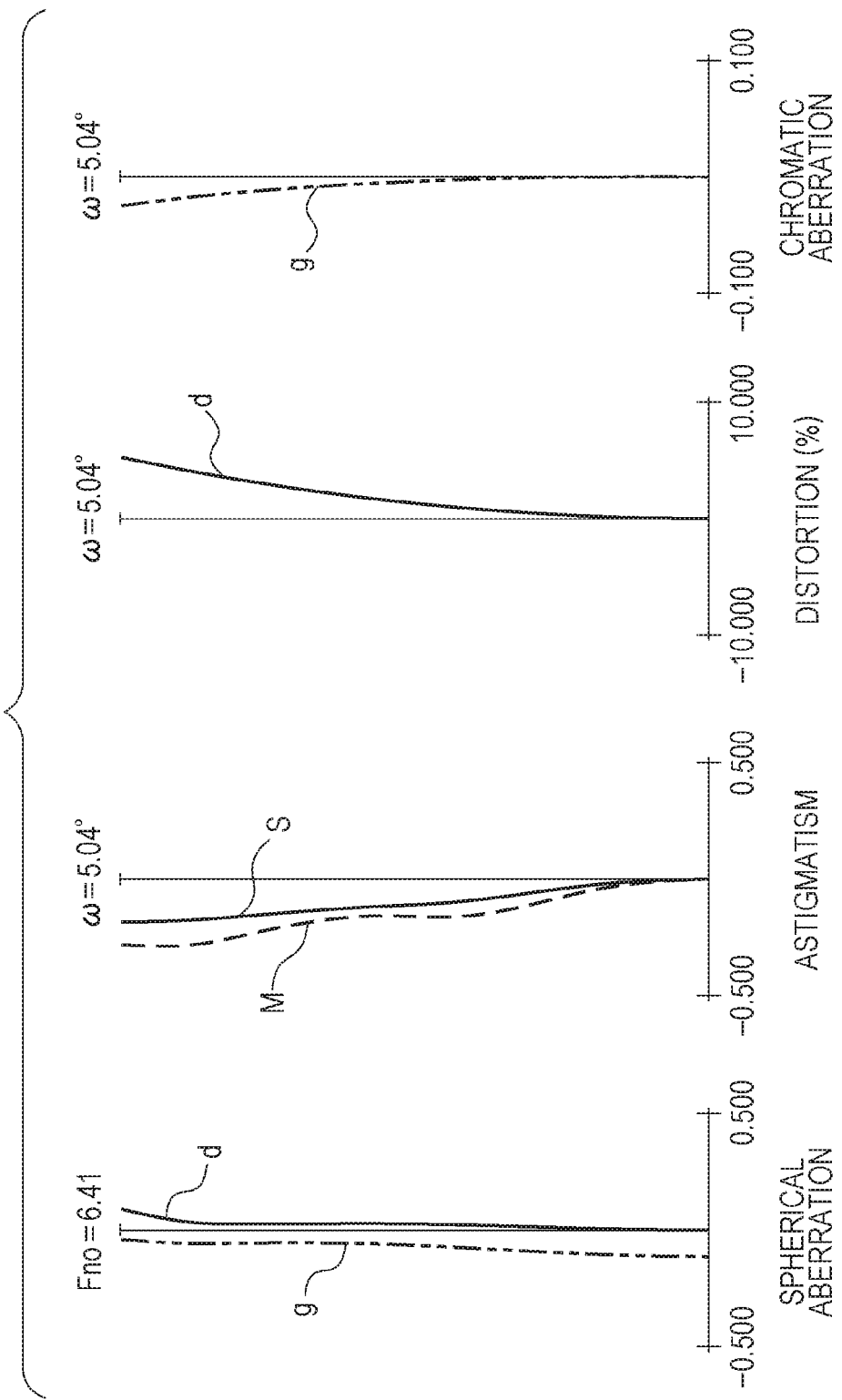

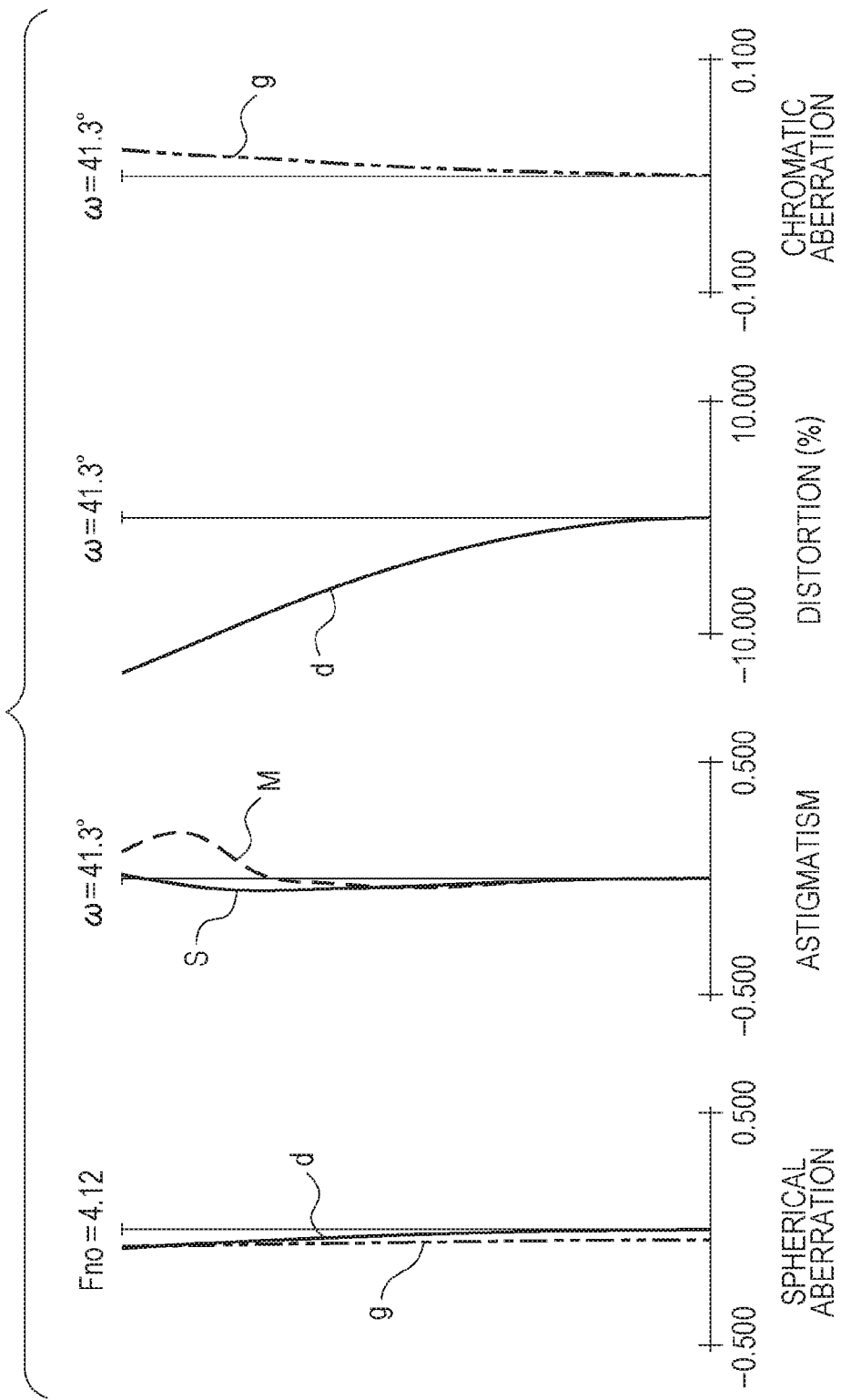

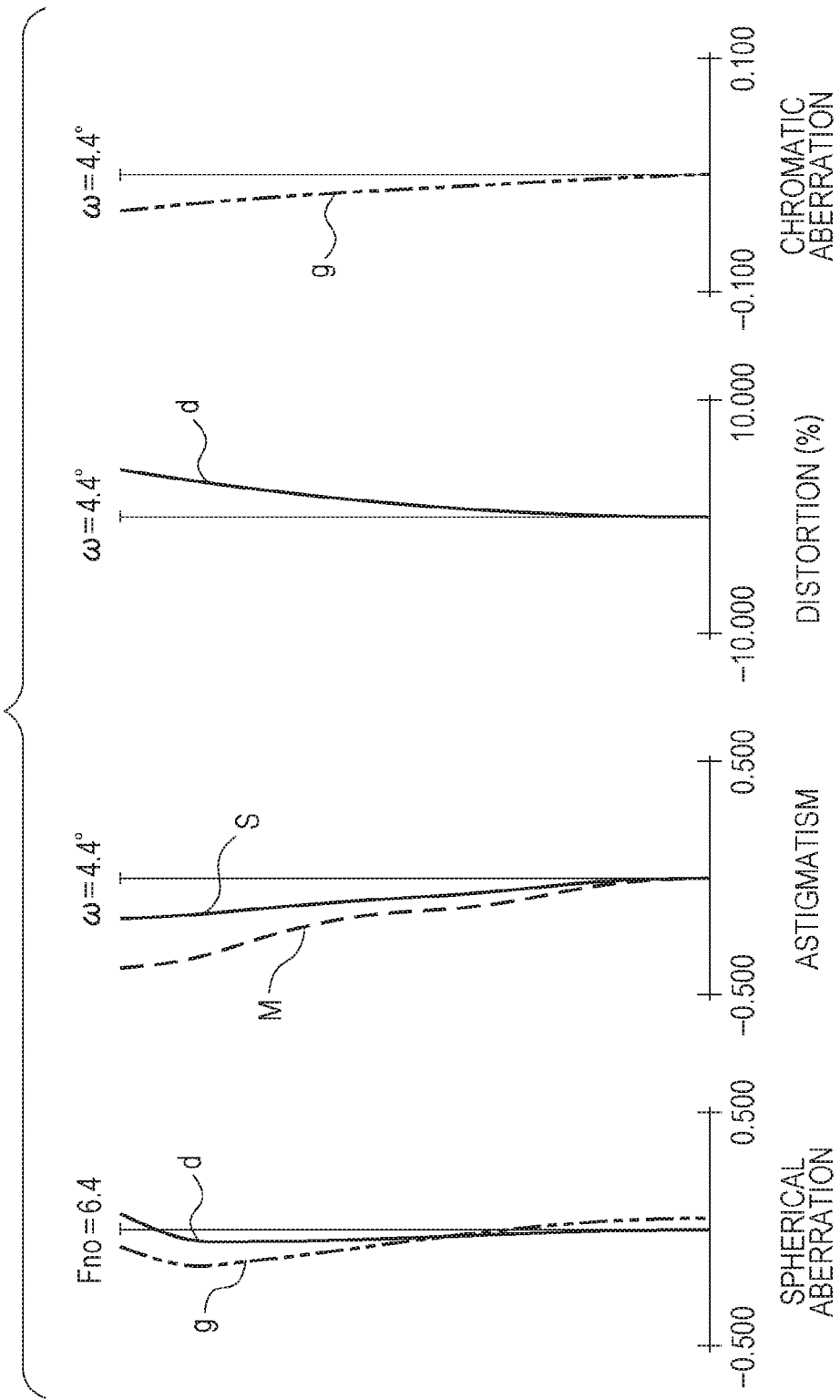

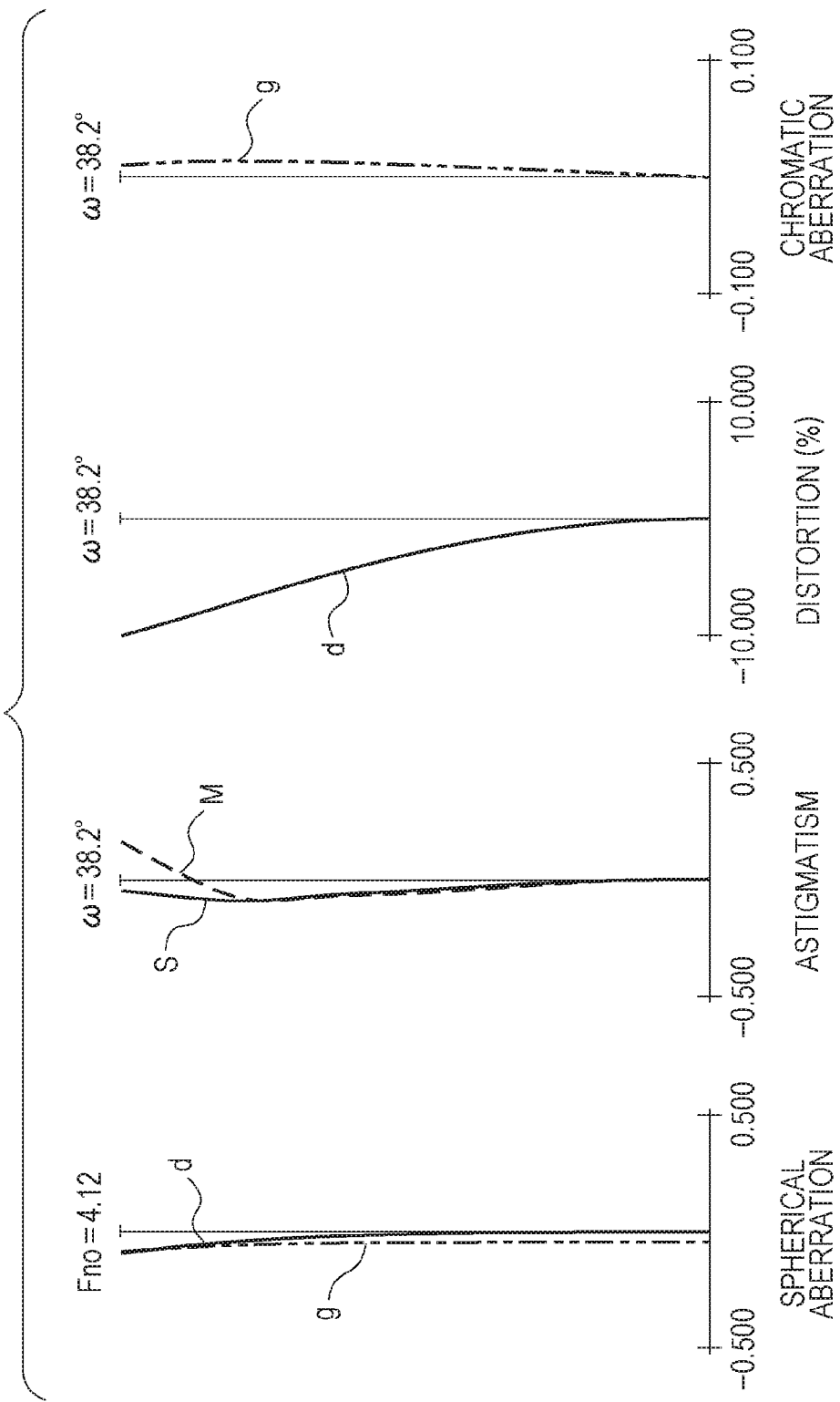

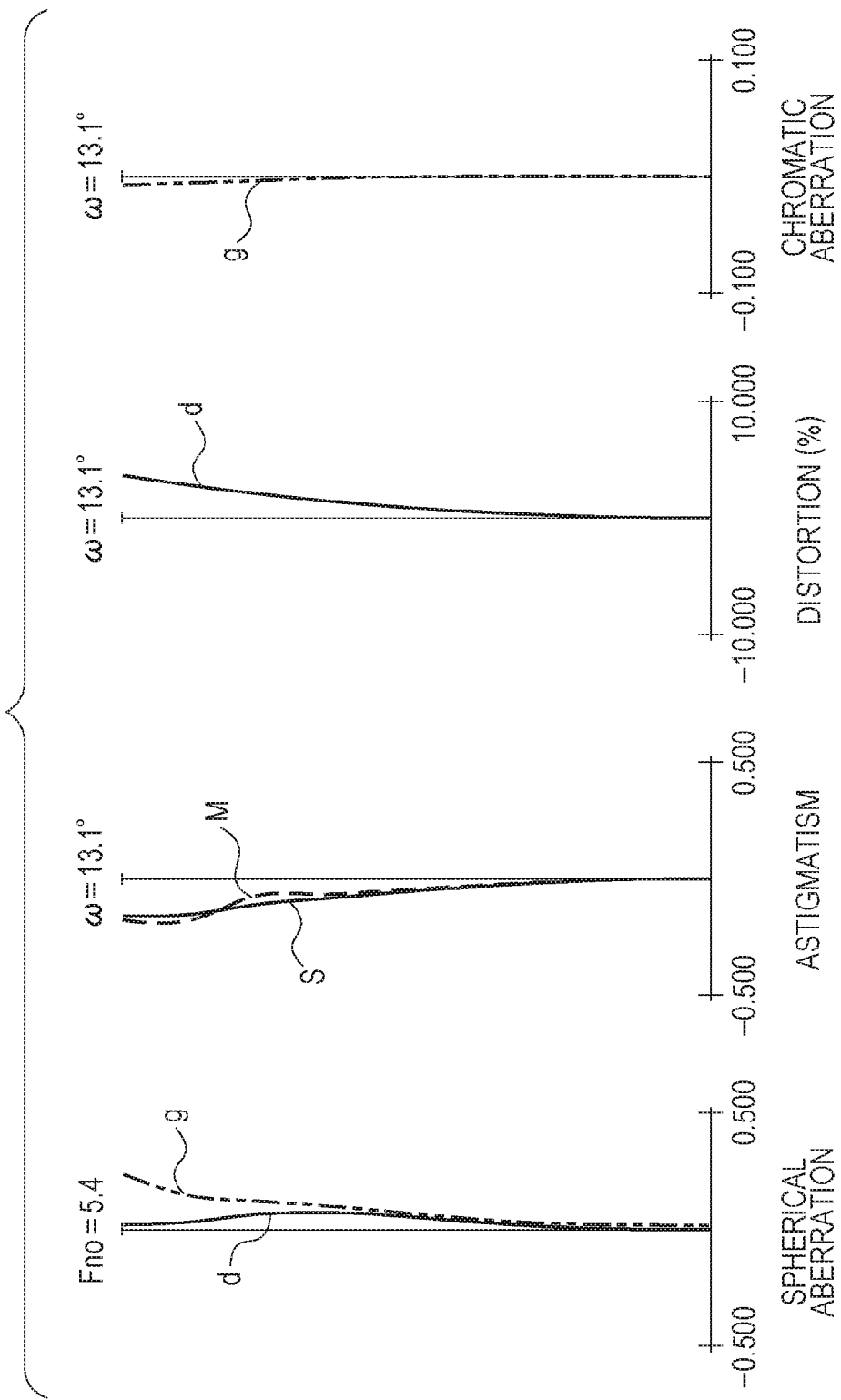

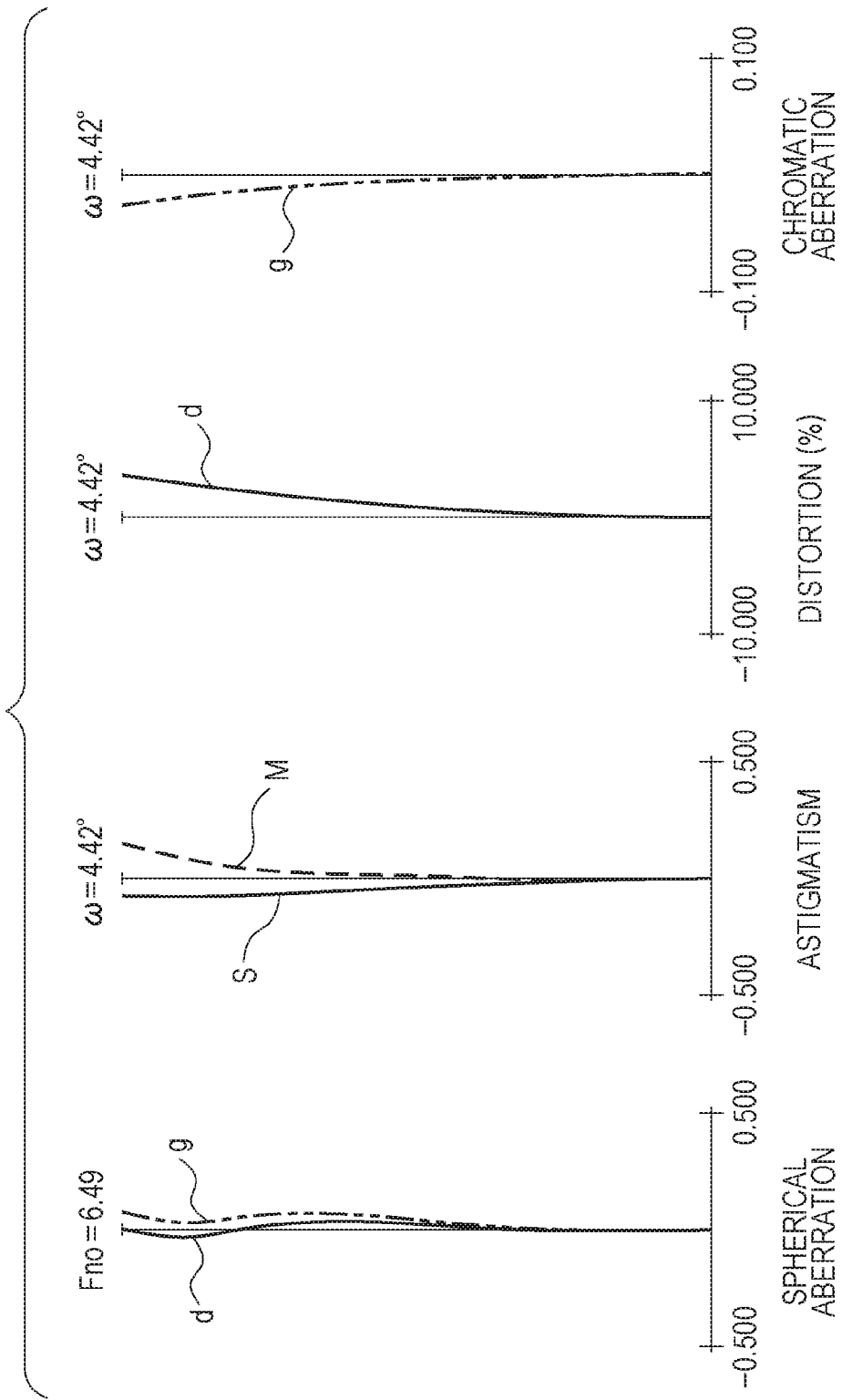

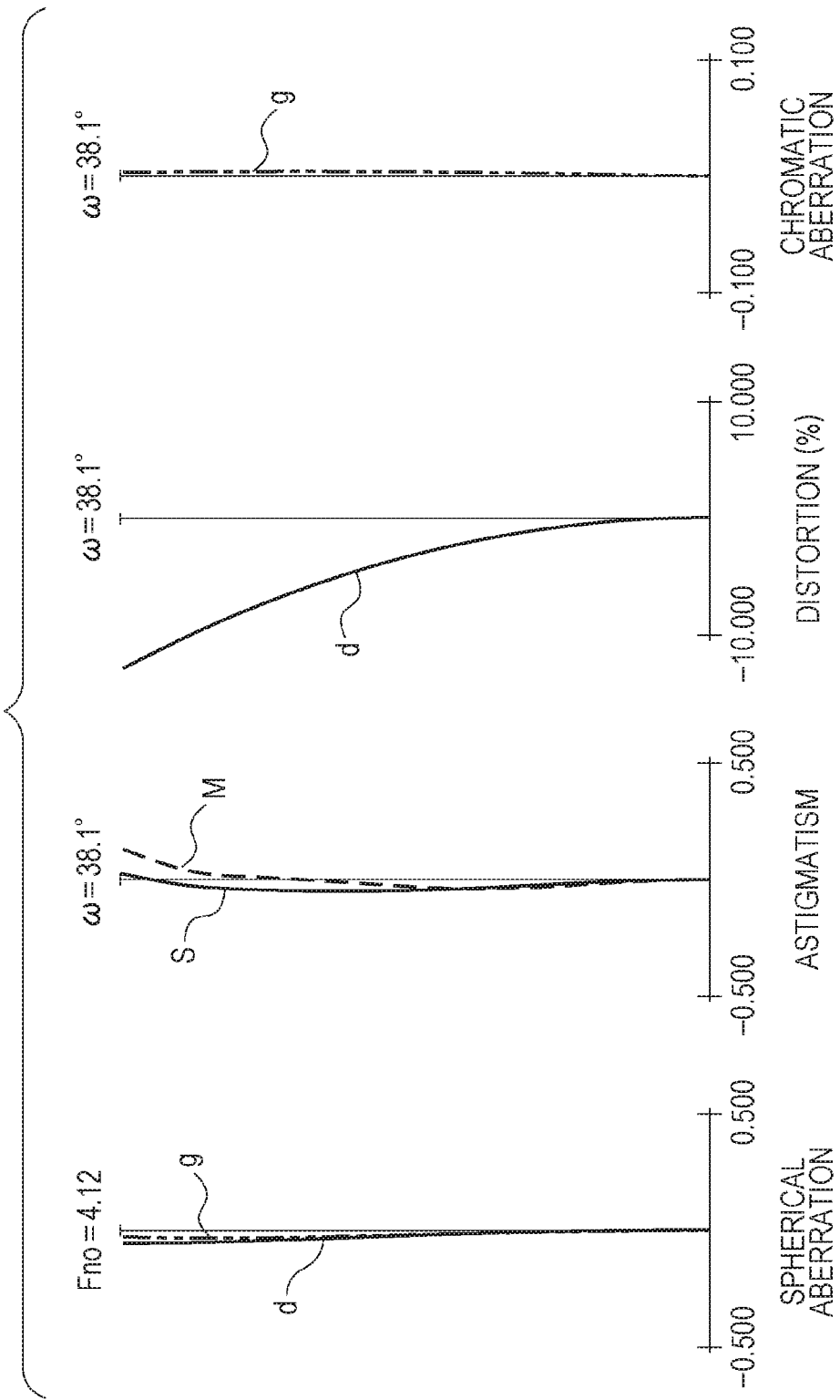

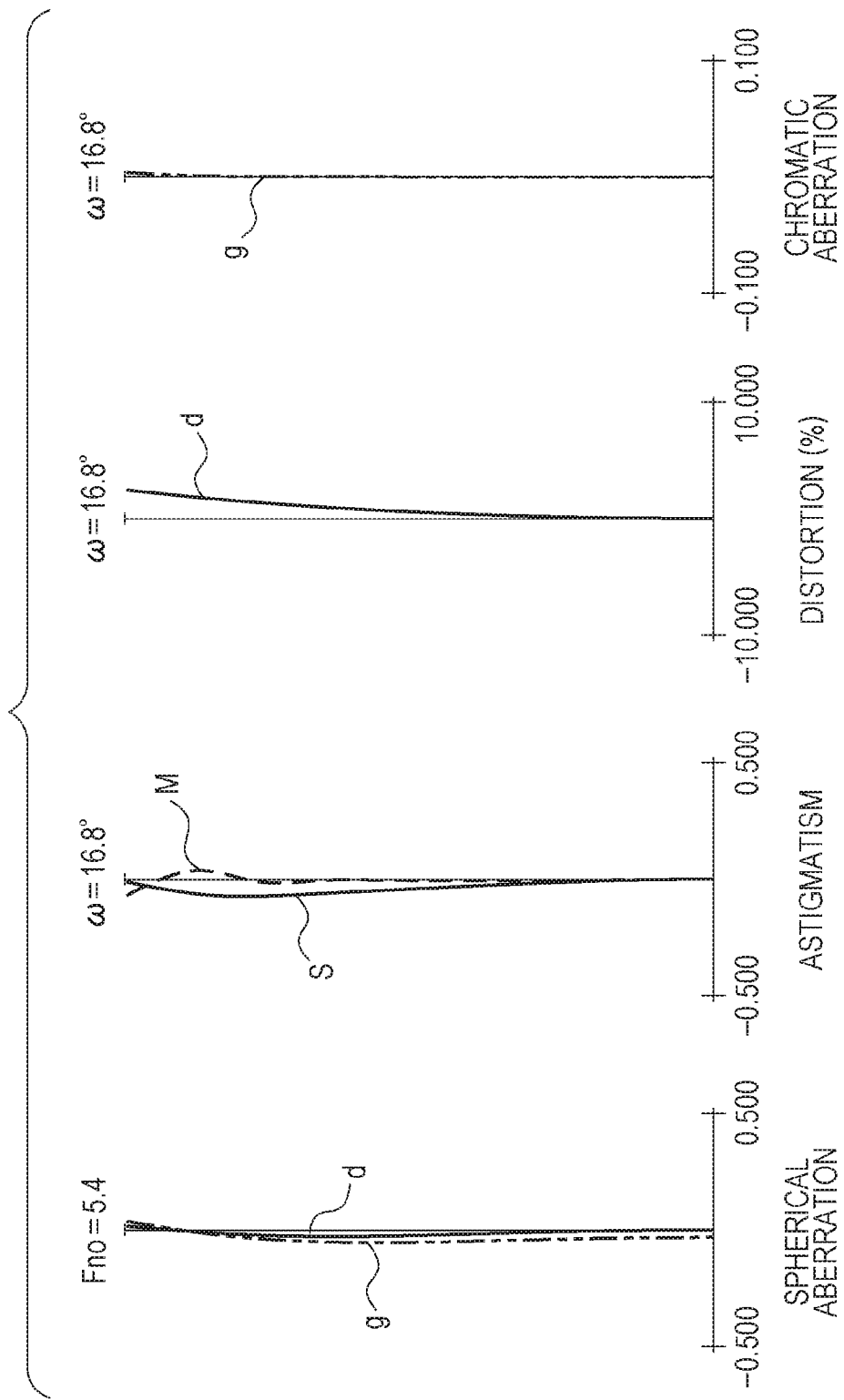

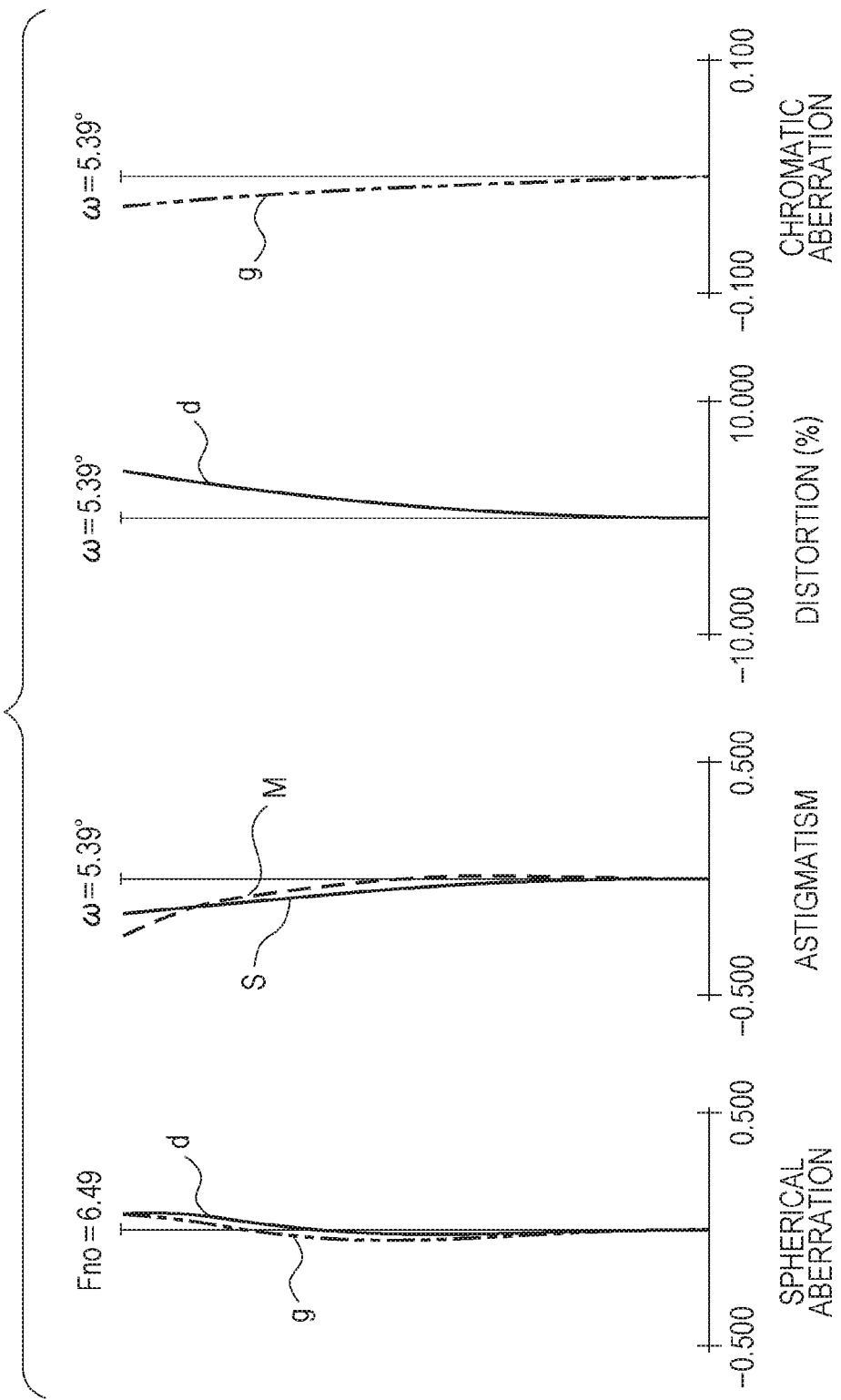

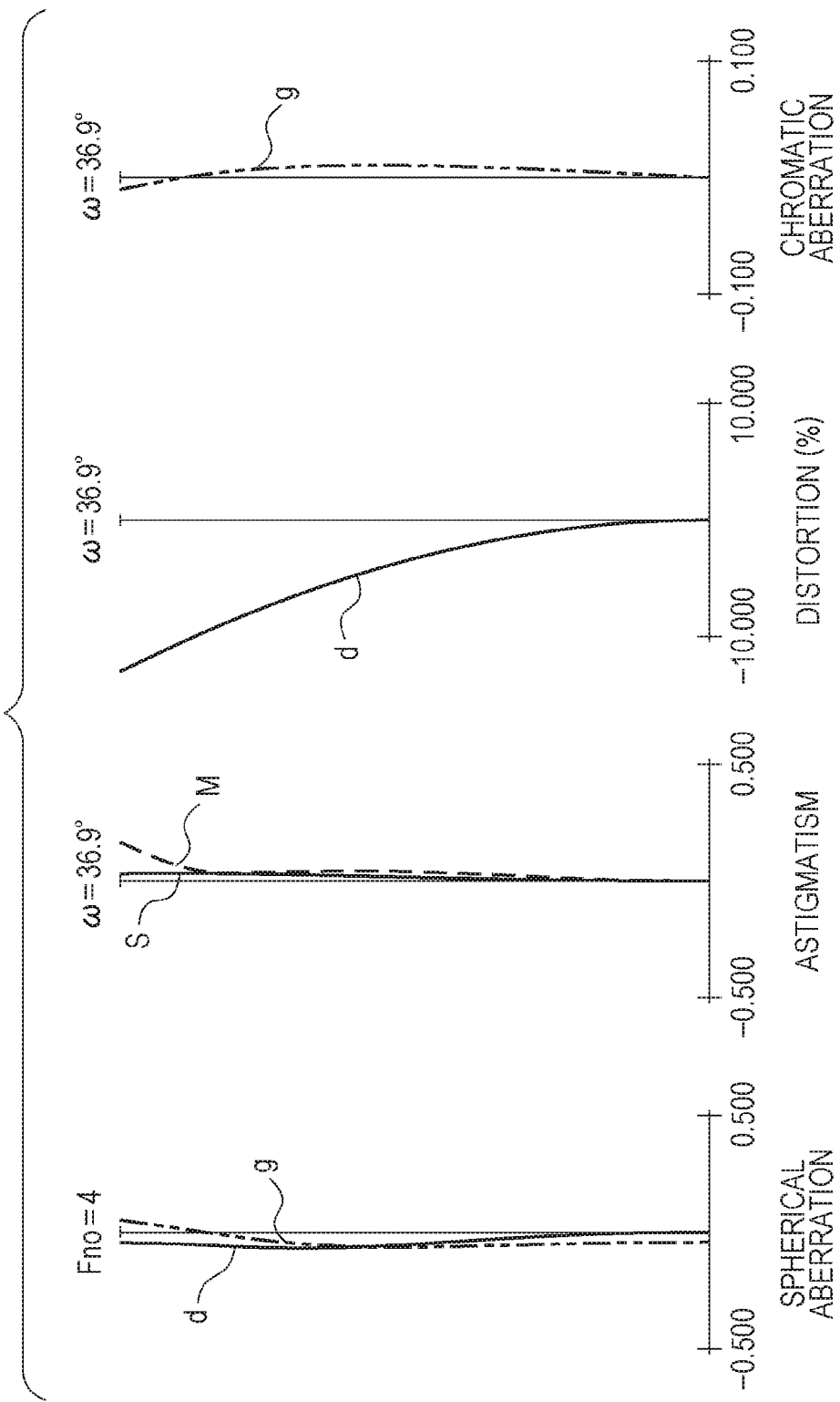

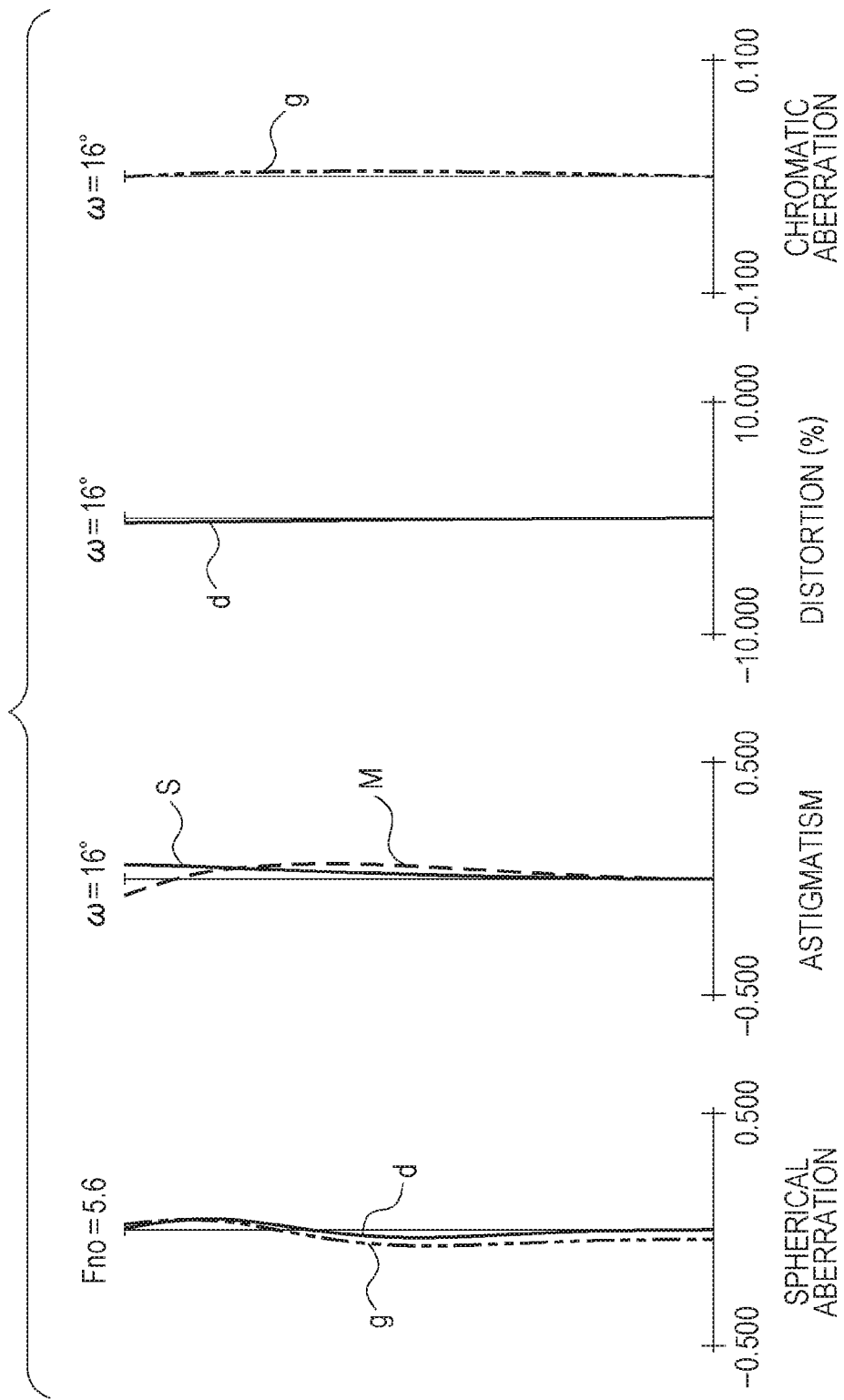

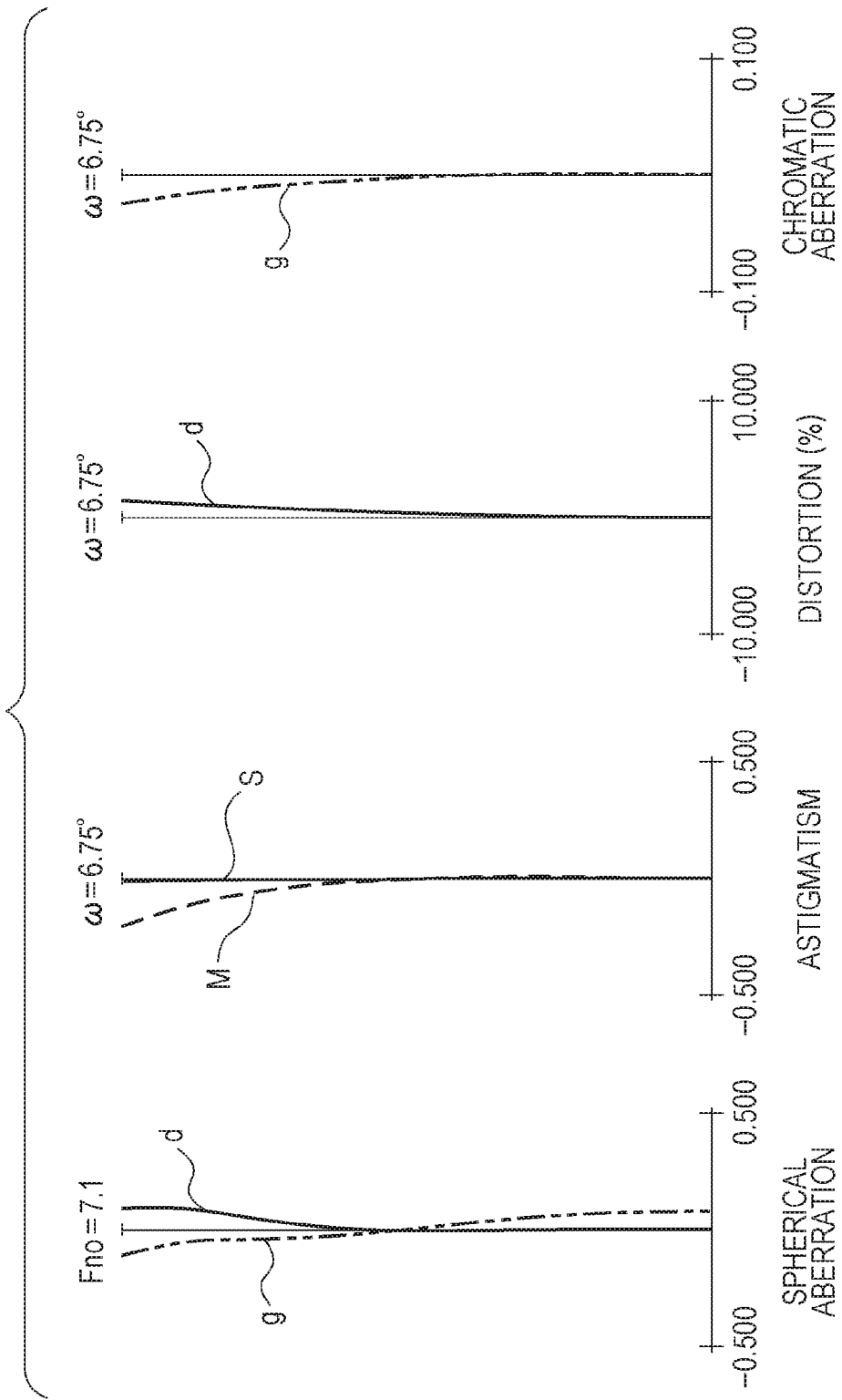

ZOOM LENS AND IMAGE PICKUP APPARATUS

BACKGROUND OF THE INVENTION

Field of the Invention

The aspect of the embodiments relates to a zoom lens and an image pickup apparatus.

Description of the Related Art

There is a demand for a zoom lens having a compact entire system, high zoom ratio, high optical performance, and enabling inhibition of ghosting from occurring.

Japanese Patent Laid-Open No. 2017-156428 discloses a zoom lens including a first lens unit having positive refractive power, a second lens unit having negative refractive power, a third lens unit having positive refractive power, a fourth lens unit having negative refractive power, and a fifth lens unit having positive refractive power, the fourth lens unit and the fifth lens unit each including only a cemented lens.

Like the zoom lens described in Japanese Patent Laid-Open No. 2017-156428, reduction of the number of boundary surfaces between air and lenses with a lens unit including only a cemented lens, located relatively on the image side, enables inhibition of ghosting from occurring. However, in a case where the zoom lens in Japanese Patent Laid-Open No. 2017-156428 is made to have high zoom ratio, ghosts are more likely to be condensed onto an image plane during booming from the wide-angle end to the telephoto end. Thus, there is the possibility of acquisition of a captured image including conspicuous ghosts.

SUMMARY OF THE INVENTION

A zoom lens includes: a first lens unit having positive refractive power; a second lens unit having negative refractive power; a third lens unit having positive refractive power; an N-1-th lens unit disposed second closest to an image side; and an N-th lens unit disposed closest to the image side, the first lens unit, the second lens unit, and the third lens unit being disposed in order from an object side to the image side, an interval between adjacent lens units varying at zooming, wherein the N-1-th lens unit and the N-th lens unit each includes one or more cemented lens including a positive lens and a negative lens, and move at zooming, and at least one lens unit of the N-1-th lens unit and the N-th lens unit has a cemented surface satisfying the following inequality:

$$0.00 < \text{len}/R\text{cem} < 3.50$$

where Rcem is a radius of curvature of the cemented surface of the cemented lens, and len is a length acquired by addition of a back focus to a distance on an optical axis from the cemented surface to a surface closest to the image side in the zoom lens, and
the following inequalities are satisfied:

$$0.20 < m\_\text{max}/tdw < 10.00$$

$$1.20 < fw/skw < 2.60$$

where m_max is a larger amount of an amount of movement of the N-1-th lens unit and an amount of movement of the N-th lens unit at zooming from a wide-angle end to a telephoto end, tdw is an overall length of the zoom lens at the wide-angle end, fw is a focal length of the zoom lens at the wide-angle end, and skw is the back focus of the zoom lens at the wide-angle end.

Further features of the disclosure will become apparent from the following description of exemplary embodiments (with reference to the attached drawings).

BRIEF DESCRIPTION OF THE DRAWINGS

FIG. 1 is a sectional view of a zoom lens according to a first embodiment.

FIGS. 2A to 2C are aberration diagrams of the zoom lens according to the first embodiment.

FIGS. 4A to 4C are aberration diagrams of the zoom lens according to the second embodiment.

FIGS. 6A to 6C are aberration diagrams of the zoom lens according to the third embodiment.

FIGS. 8A to 8C are aberration diagrams of the zoom lens according to the fourth embodiment.

FIGS. 10A to 10C are aberration diagrams of the zoom lens according to the fifth embodiment.

FIGS. 12A to 12C are aberration diagrams of the zoom lens according to the sixth embodiment.

DESCRIPTION OF THE EMBODIMENTS

Figure 3:
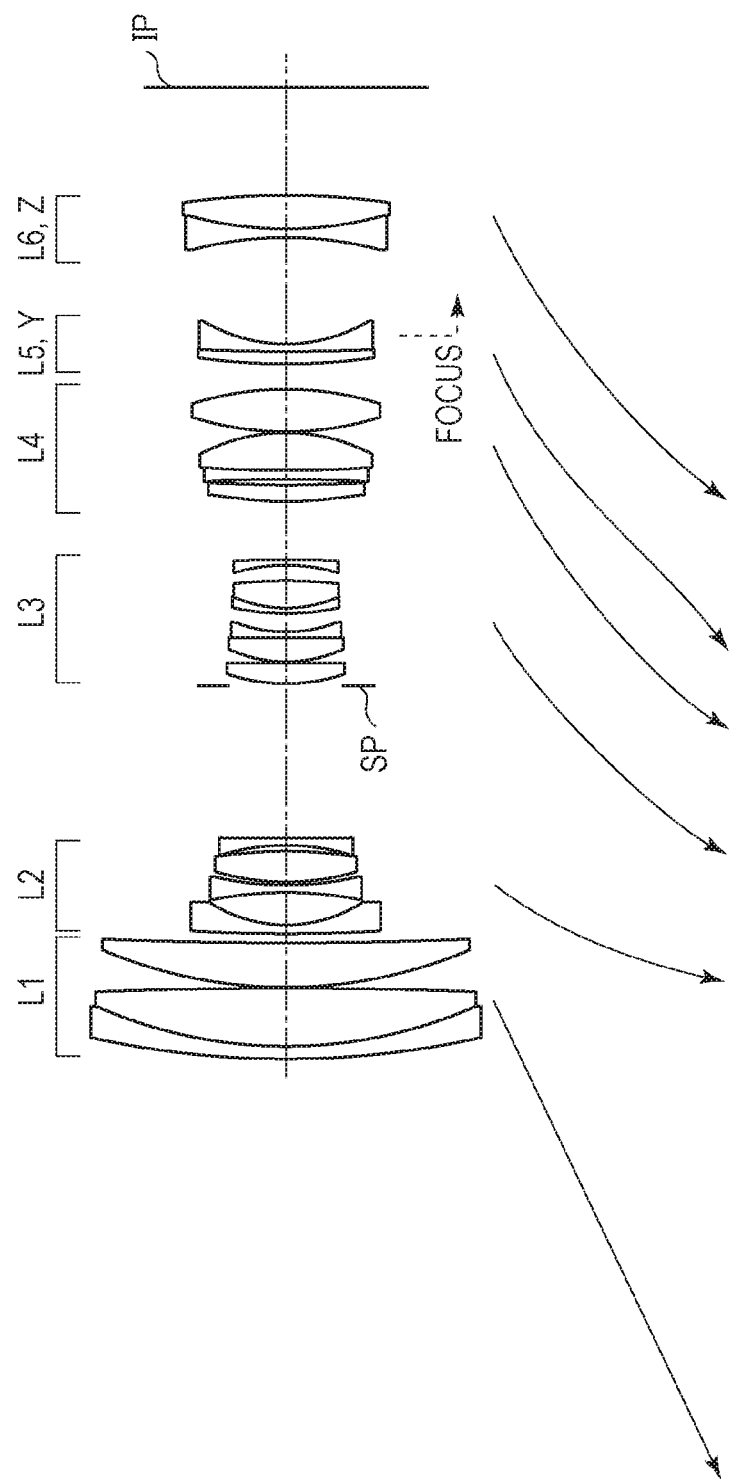
FIG. 3 is a sectional view of a zoom lens according to a second embodiment.

Zoom lenses and an image pickup apparatus according to embodiments of the disclosure will be described in detail below, on the basis of the accompanying drawings.

[Zoom Lenses According to Embodiments]

The zoom lens according to each embodiment is an image pickup optical system for an image pickup apparatus, such as a digital still camera, a broadcasting camera, a silver-halide film camera, or a monitoring camera.

In respective sectional views of zoom lenses illustrated in FIGS. 1, 3, 5, 7, 9, and 11, the left is the object side (front) and the right is the image side (rear). In each sectional view, when i is defined as the number of a lens unit from the object side to the image side, Li indicates an i-th lens unit. An aperture stop SP determines (restricts) the beam of the full aperture F-number (Fno). At focusing from an infinite-distance object to a shortest-distance object, a focus lens unit moves as indicated with a broken line in the figure.

For example, in a case where the zoom lens according to each embodiment is used for a digital still camera, a broadcasting camera, or the like, an image plane IP corresponds to the image pickup surface of an image pickup element (photoelectric conversion element), such as a charge-coupled device (CCD) sensor or a complementary metal-oxide semiconductor (CMOS) sensor. In a case where the zoom lens according to each embodiment is used for a silver-halide film camera, the image plane IP corresponds to a film surface.

FIGS. 2A to 2C, 4A to 4C, 6A to 6C, 8A to 8C, 10A to 10C, and 12A to 12C are respective aberration diagrams of the zoom lenses of the embodiments. In each spherical aberration diagram, Fno represents F-number. In each spherical aberration diagram, a solid line represents the d-line (wavelength of 587.6 nm), and a chain double-dashed line represents the g-line (wavelength of 435.8 nm). In each astigmatism diagram, a broken line M represents the meridional image plane, and a solid line S represents the sagittal image plane. Distortion aberration is indicated for the d-line. Lateral chromatic aberration is indicated for the g-line. ω represents a half angle of view (°).

As used herein, the "lens unit" may include a plurality of lenses or may include one lens. The "back focus" is the length expressing, with air conversion length, the distance on the optical axis from the backmost surface (surface closest to the image side) of the zoom lens to the image plane IP. The "overall lens length" is the distance on the optical axis from the forefront surface (surface closest to the object side) to the backmost surface of the zoom lens, having the back focus added thereto. The Abbe number vd of a material is expressed as the following equation:

$$vd=(Nd-1)/(NF-NC)$$

where Ng, NF, Nd, and NC represent the refractive indices of the material at the g-line (wavelength of 435.8 nm), the F-line (wavelength of 486.1 nm), the d-line (wavelength of 587.6 nm), and the C-line (wavelength of 656.3 nm), respectively. The "wide-angle end" is the zooming position at which the focal length of the zoom lens is shortest. The "telephoto end" is the zooming position at which the focal length of the zoom lens is longest.

A zoom lens according to the present embodiment includes a first lens unit having positive refractive power, a second lens unit having negative refractive power, a third lens unit having positive refractive power, an N-1-th lens unit disposed second closest to the image side, and an N-th lens unit disposed closest to the image side, the first lens unit, the second lens unit, and the third lens unit being disposed in sequence from the object side to the image side. At zooming, the interval between adjacent lens units varies. The first lens unit, the second lens unit, and the third lens unit are arranged in this manner, so that the zoom lens acquires relatively high zoom ratio.

The N-1-th lens unit and the N-th lens unit each includes one or more cemented lens including a positive lens and a negative lens, and move at zooming.

The N-1-th lens unit and the N-th lens unit each includes the cemented lens, and thus the number of boundary surfaces between air and lenses is small in a lens unit disposed on the side relatively close to the image plane. This arrangement enables reduction of ghosting due to reflection to the image side in the zoom lens of light reflected to the object side by, for example, an image pickup element disposed at the image plane.

Figure 13:
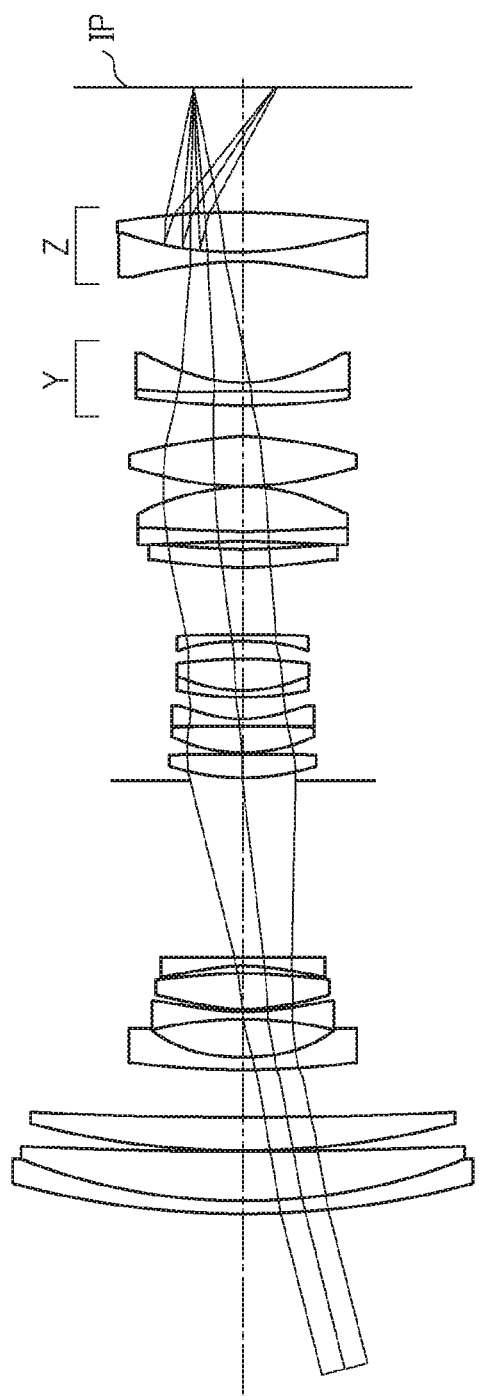
FIG. 13 is a view for describing ghosting.

A lens for correction of lateral chromatic aberration is disposed at a position such that the principal ray of an off-axis beam is high in height, resulting in enhancement of correction effect. Thus, as illustrated in FIG. 13, a lens unit including a positive lens and a negative lens is disposed at a position close to the image plane such that an off-axis beam is high in height, so that the correction effect of lateral chromatic aberration is enhanced. The number of positive lenses and the number of negative lenses in one cemented lens are not limited to one, and thus may be at least two.

Furthermore, movement of the N-1-th lens unit and the N-th lens unit at zooming causes less ghosting in the entire zoom range and enables acquisition of high optical performance in the entire zoom range.

The cemented lens of at least one of the N-1-th lens unit and the N-th lens unit includes a cemented surface satisfying the following inequality (conditional expression) (1):

$$0.00<len/Rcem<3.50 \qquad (1)$$

where Rcem represents the radius of curvature of the cemented surface of the cemented lens, and len represents the length acquired by addition of the back focus to the distance on the optical axis from the cemented surface to the surface closest to the image side in the zoom lens. Note that the zoom lens has at least one cemented lens having a cemented surface satisfying the inequality (1).

Furthermore, the zoom lens according to the present embodiment satisfies the following inequalities (2) and (3):

$$0.20<m\_max/tdw<10.0 \qquad (2)$$

$$1.20<fw/skw<2.60 \qquad (3)$$

where m_max represents the larger amount of the amount of movement of the N-1-th lens unit and the amount of movement of the N-th lens unit at zooming from the wide-angle end to the telephoto end, tdw represents the overall length of the zoom lens at the wide-angle end, fw represents the focal length of the zoom lens at the wide-angle end, and skw represents the back focus of the zoom lens at the wide-angle end.

The inequality (1) relates to the relationship between the radius of curvature of the cemented surface of the cemented lens in at least one lens unit of the N-1-th lens unit and the N-th lens unit and the length from the cemented surface to the image plane. Lowering the lower limit of the inequality (1) is physically difficult. Exceeding the upper limit of the inequality (1) causes reduction of the radius of curvature of the cemented surface and increase of the refractive power of the cemented lens. This arrangement makes, for example, correction of lateral chromatic aberration difficult, and thus the exceeding is unfavorable.

The inequality (2) relates to the relationship between the amount of movement at zooming of at least one lens unit of the N-1-th lens unit and the N-th lens unit and the overall lens length at the wide-angle end. Lowering the lower limit of the inequality (2) causes the overall lens length to lengthen at the wide-angle end, so that miniaturization of the zoom lens is difficult. Thus, the lowering is unfavorable. Exceeding the upper limit of the inequality (2) causes the overall lens length to shorten. Thus, the refractive power of each lens unit is increasing. This arrangement causes various aberrations, such as field curvature, to increase, so that high optical performance is difficult to acquire. Thus, the exceeding is unfavorable.

The inequality (3) relates to the focal length of the zoom lens and the back focus at the wide-angle end. Lowering the lower limit of the inequality (3) causes the back focus to lengthen, resulting in long overall lens length. As a result, miniaturization of the zoom lens is difficult. Thus, the lowering is unfavorable. When the back focus shortens due to exceeding the upper limit of the inequality (3), namely, when the back focus shortens considerably at the wide-angle end due to exceeding the upper limit, the maximum incident angle of an off-axis ray to the image plane increases. As a result, so-called shading occurs, such as light falloff or coloration on the periphery of the image height due to the image pickup element. Thus, the exceeding is unfavorable.

Thus, simultaneous satisfaction of the configuration and the inequalities (1) to (3) enables the zoom lens according to the present embodiment to inhibit ghosts from entering the image pickup element, such as ghosting, and to acquire high optical performance over the entire zoom range with high zoom ratio.

The zoom lens according to the present embodiment satisfying the lens configuration and the inequalities, has a compact entire system, high zoom ratio, and less ghosting and high optical performance over the entire zoom range.

Note that, favorably, the numerical ranges of the inequalities (1) to (3) are set as follows:

$$0.00<\text{len}/R\text{cem}<3.00 \tag{1a}$$

$$0.205<m\_\text{max}/tdw<7.00 \tag{2a}$$

$$1.205<fw/skw<2.55 \tag{3a}$$

More favorably, the numerical ranges of the inequalities (1) to (3) are set as follows:

$$0.00<\text{len}/R\text{cem}<2.60 \tag{1b}$$

$$0.208<m\_\text{max}/tdw<3.00 \tag{2b}$$

$$1.208<fw/skw<2.53 \tag{3b}$$

Furthermore, favorably, at least one lens unit of the N-1-th lens unit and the N-th lens unit satisfies the following inequality (4):

$$0.50<fp/|fn|<2.50 \tag{4}$$

where fp represents the focal length of the positive lens in the lens unit, and fn represents the focal length of the negative lens cemented to the positive lens.

The inequality (4) relates to the focal lengths of the positive lens and the negative lens in each of the cemented lenses of the N-1-th lens unit and the N-th lens unit. Lowering the lower limit or exceeding the upper limit in the inequality (4) causes the balance between the focal length of the negative lens and the focal length of the positive lens, namely, the balance between the refractive power of the negative lens and the refractive power of the positive lens, to deteriorate. As a result, correction of lateral chromatic aberration is difficult. Thus, the lowering and the exceeding are unfavorable.

Favorably, at least one lens unit of the N-1-th lens unit and the N-th lens unit moves at focusing. Miniaturization of a drive mechanism for focusing with a small-diameter lens unit disposed relatively on the image side as a focus lens unit in the zoom lens, enables miniaturization of the zoom lens.

Particularly, in a case where the N-1-th lens unit moves at focusing, favorably, the following inequality (5) is satisfied:

$$0.15<|fy/fz|<2.00 \tag{5}$$

where fy represents the focal length of the N-1-th lens unit and fz represents the focal length of the N-th lens unit.

The inequality (5) relates to the ratio in focal length between the N-1-th lens unit and the N-th lens unit. When the focal length of the N-1-th lens unit shortens due to lowering the lower limit of the inequality (5) (absolute value of the focal length decreases), the refractive power of the N-1-th lens unit strengthens, resulting in increase of aberration variation at focusing. Thus, the lowering is unfavorable.

When the focal length of the N-1-th lens unit lengthens due to exceeding the upper limit of the inequality (5), the refractive power of the N-1-th lens unit weakens, resulting in increase of the amount of movement at focusing. This arrangement causes the drive mechanism for focusing to increase in size, resulting in a long overall lens length. As a result, the zoom lens is difficult to miniaturize. Thus, the exceeding is unfavorable.

Note that satisfaction of at least one inequality of the inequalities (4) and (5) enables acquisition of the above effect.

Note that, favorably, the numerical ranges of the inequalities (4) and (5) are set as follows:

$$0.70<fp/|fn|<2.00 \tag{4a}$$

$$0.20<|fy/fz|<1.70 \tag{5a}$$

More favorably, the numeral ranges of the inequalities (4) and (5) are set as follows:

$$1.00<fp/|fn|<1.80 \tag{4b}$$

$$0.25<|fy/fz|<1.20 \tag{5b}$$

The number of cemented lenses in the N-1-th lens unit and the N-th lens unit may be one or at least two. However, favorably, the number of cemented lenses is one. This arrangement enables reduction of the number of surfaces, in contact with air, high in reflectivity, so that ghosting can be reduced.

Favorably, at least one lens unit of the N-1-th lens unit and the N-th lens unit has negative refractive power. A lens unit having negative refractive power is disposed relatively on the image side in the zoom lens, so that the zoom lens can be provided as a telephoto type, resulting in a short overall lens length.

Favorably, either all lenses in the second lens unit or all lenses disposed on the object side with respect to the aperture stop or both of the all lenses are spherical lenses. This arrangement enables acquisition of high correction effect for various aberrations except distortion aberration. Particularly, in a case where correction of distortion aberration is performed electronically after an image pickup, an image having less aberration can be acquired advantageously.

Zoom lenses according to specific embodiments will be described below.

First to Fourth Embodiments

FIG. 1 is a sectional view of a zoom lens ZL according to a first embodiment, at the wide-angle end at focusing on an object at infinity. FIGS. 2A to 2C are aberration diagrams of the zoom lens ZL according to the first embodiment, at focusing on the object at infinity. FIG. 2A illustrates aberrations at the wide-angle end. FIG. 2B illustrates aberrations at an intermediate zooming position. FIG. 2C illustrates aberrations at the telephoto end.

Figure 4B:
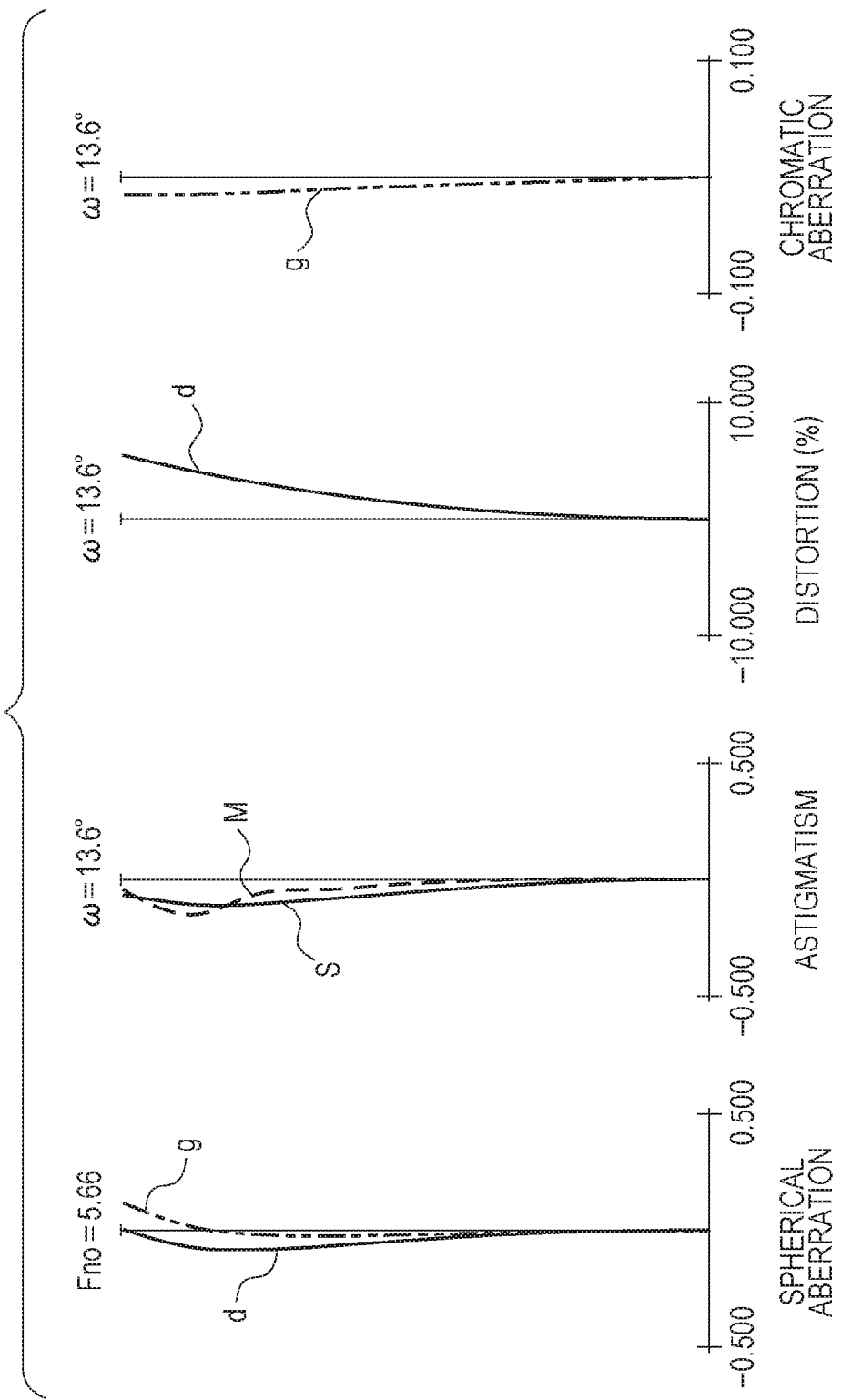

FIG. 3 is a sectional view of a zoom lens ZL according to a second embodiment, at the wide-angle end at focusing on an object at infinity. FIGS. 4A to 4C are aberration diagrams of the zoom lens ZL according to the second embodiment, at focusing on the object at infinity. FIG. 4A illustrates aberrations at the wide-angle end. FIG. 4B illustrates aberrations at an intermediate zooming position. FIG. 4C illustrates aberrations at the telephoto end.

Figure 5:
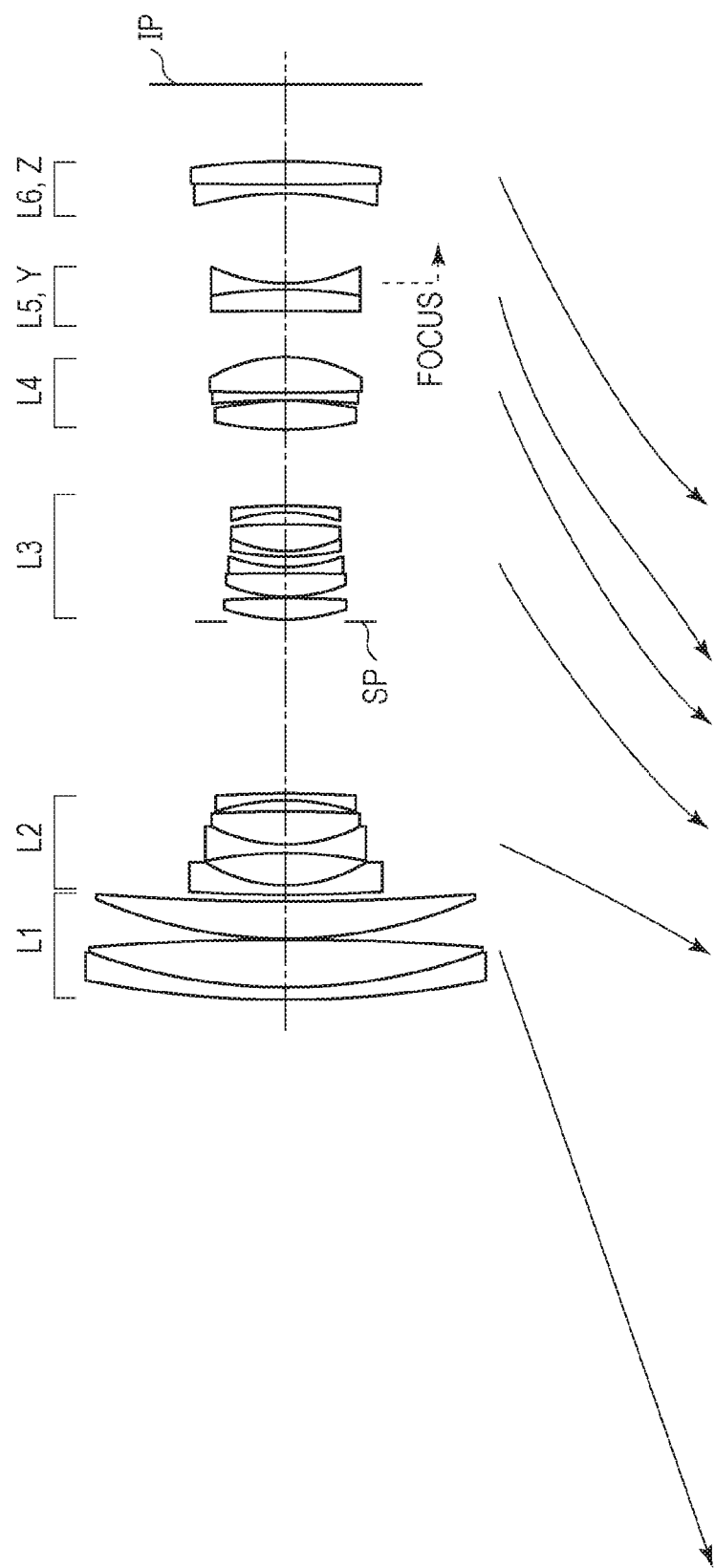
FIG. 5 is a sectional view of a zoom lens according to a third embodiment.
Figure 6B:
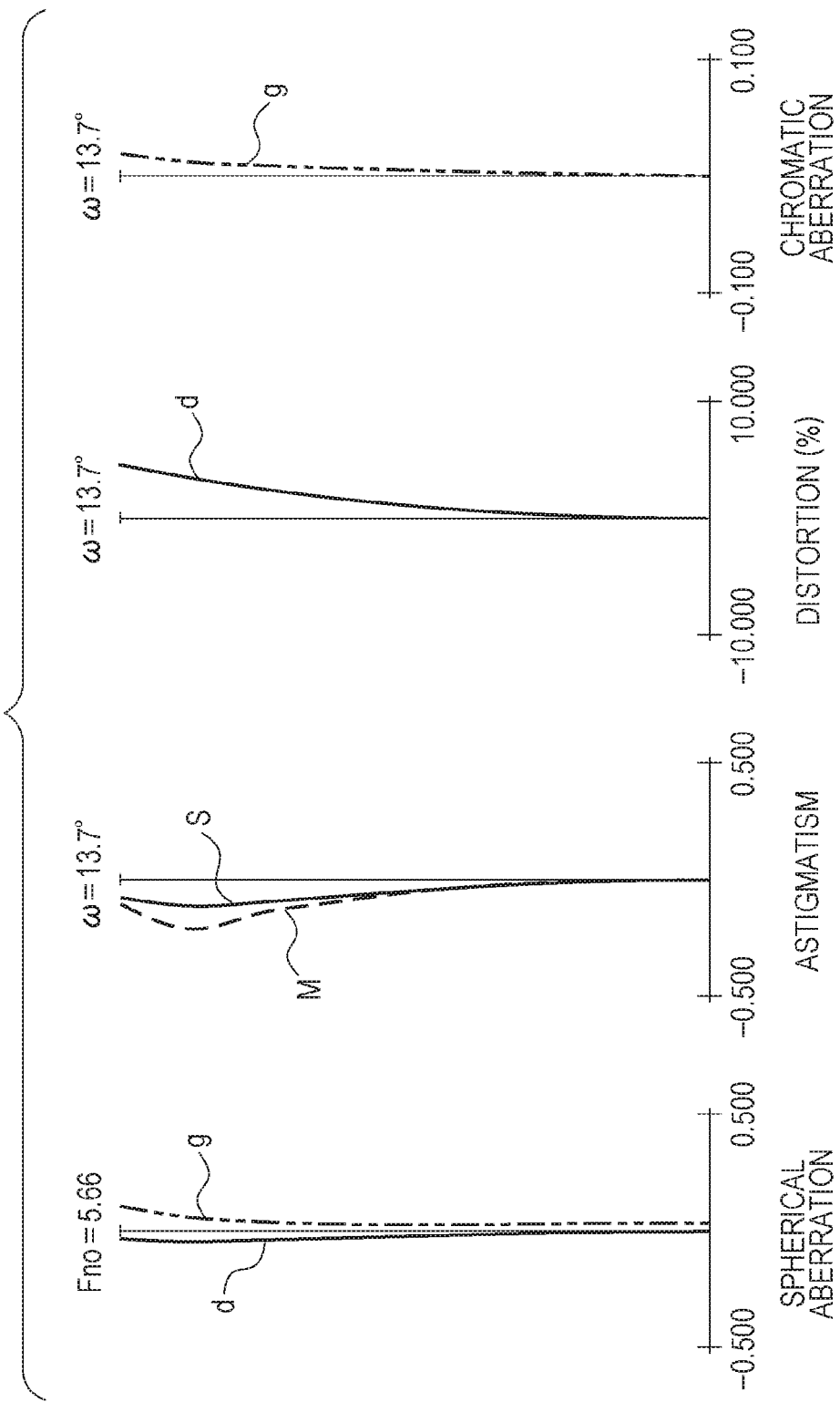

FIG. 5 is a sectional view of a zoom lens ZL according to a third embodiment, at the wide-angle end at focusing on an object at infinity. FIGS. 6A to 6C are aberration diagrams of the zoom lens ZL according to the third embodiment, at focusing on the object at infinity. FIG. 6A illustrates aberrations at the wide-angle end. FIG. 6B illustrates aberrations at an intermediate zooming position. FIG. 6C illustrates aberrations at the telephoto end.

Figure 7:
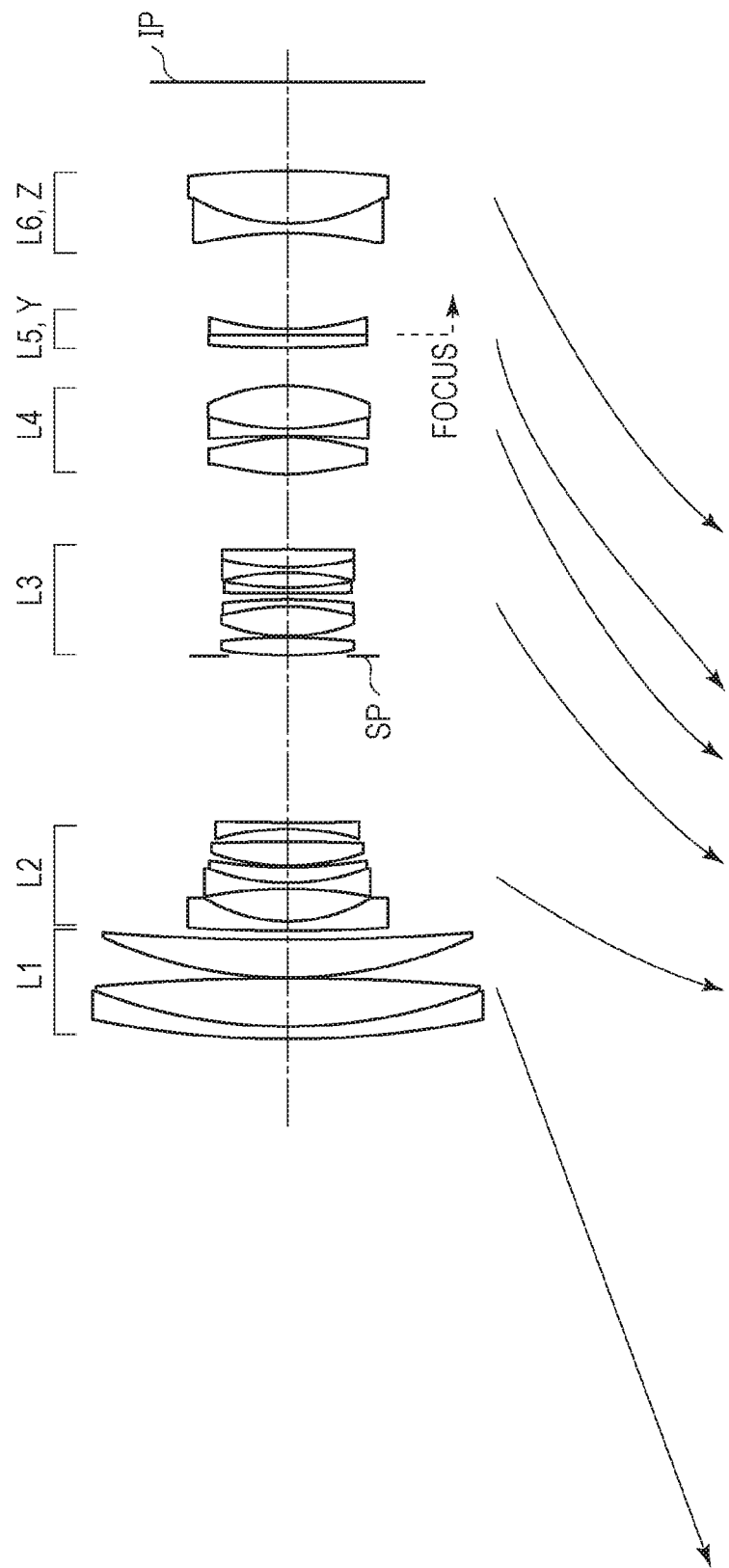
FIG. 7 is a sectional view of a zoom lens according to a fourth embodiment.

FIG. 7 is a sectional view of a zoom lens ZL according to a fourth embodiment, at the wide-angle end at focusing on an object at infinity. FIGS. 8A to 8C are aberration diagrams of the zoom lens ZL according to the fourth embodiment, at focusing on the object at infinity. FIG. 8A illustrates aberrations at the wide-angle end. FIG. 8B illustrates aberrations at an intermediate zooming position. FIG. 8C illustrates aberrations at the telephoto end.

The zoom lenses ZL according to the first to fourth embodiments are similar in main configuration, but are different in the types of materials of lenses in use and the shapes of lens surfaces Thus, the configuration common between the zoom lenses according to the first to fourth embodiments will be described.

The zoom lenses ZL according to the first to fourth embodiments each includes a first lens unit L1 having positive refractive power, a second lens unit L2 having negative refractive power, a third lens unit L3 having positive refractive power, a fourth lens unit L4 having positive refractive power, a fifth lens unit L5 having negative refractive power, and a sixth lens unit L6 having negative refractive power, disposed in sequence from the object side to the image side. The fifth lens unit L5 corresponds to the above N-1-th lens unit Y, and the sixth lens unit L6 corresponds to the above N-th lens unit Z. The third lens unit L3 has an aperture stop SP. In each zoom lens ZL, each lens unit moves at zooming, so that the interval between adjacent lens units varies. Note that the fourth lens unit L4 and the sixth lens unit L6 move identically in trajectory (integrally) at zooming. This arrangement enables simplification of a cam mechanism for driving.

The fifth lens unit L5 and the sixth lens unit L6 each has one cemented lens. Each cemented lens includes one positive lens and one negative lens.

In the zoom lenses ZL according to the first to fourth embodiments, the fifth lens unit L5 moves to the image side at focusing from an infinite-distance object to a shortest-distance object. The other lens units are immovable at focusing.

Fifth Embodiment

Figure 9:
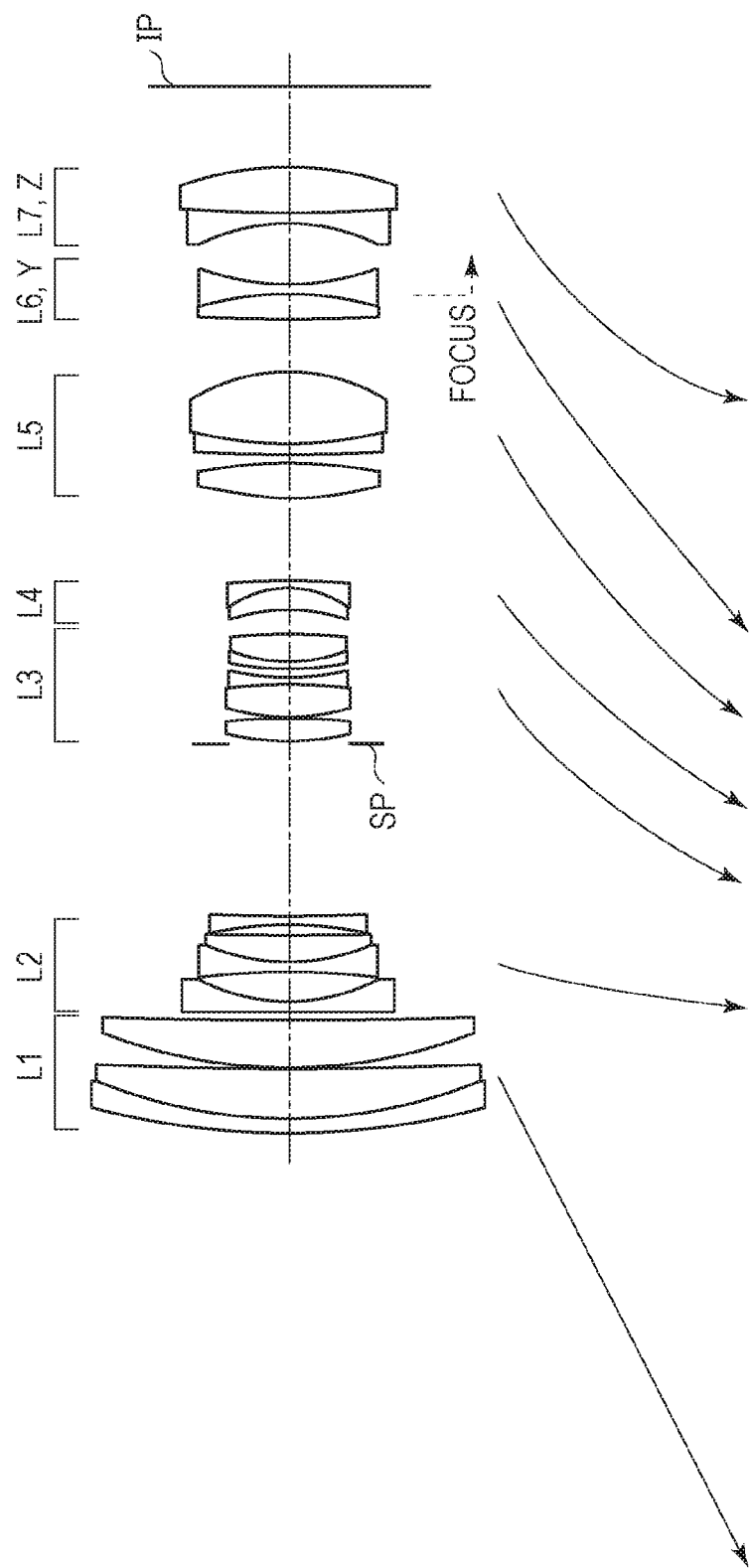
FIG. 9 is a sectional view of a zoom lens according to a fifth embodiment.

FIG. 9 is a sectional view of a zoom lens ZL according to a fifth embodiment, at the wide-angle end at focusing on an object at infinity. FIGS. 10A to 10C are aberration diagrams of the zoom lens ZL according to the fifth embodiment, at focusing on the object at infinity. FIG. 10A illustrates aberrations at the wide-angle end. FIG. 10B illustrates aberrations at an intermediate zooming position. FIG. 10C illustrates aberrations at the telephoto end.

The zoom lens ZL according to the fifth embodiment includes a first lens unit L1 having positive refractive power, a second lens unit L2 having negative refractive power, a third lens unit L3 having positive refractive power, a fourth lens unit L4 having negative refractive power, a fifth lens unit L5 having positive refractive power, a sixth lens unit L6 having negative refractive power, and a seventh lens unit L7 having negative refractive power, disposed in sequence from the object side to the image side. The sixth lens unit L6 corresponds to the above N-1-th lens unit Y, and the seventh lens unit L7 corresponds to the above N-th lens unit Z. The third lens unit L3 has an aperture stop SP. In the zoom lens ZL, each lens unit moves at zooming, so that the interval between adjacent lens units varies. According to the present embodiment, the lens units move differently in trajectory.

The sixth lens unit L6 and the seventh lens unit L7 each have one cemented lens. Each cemented lens includes one positive lens and one negative lens.

In the zoom lens ZL according to the fifth embodiment, the sixth lens unit L6 moves to the image side at focusing from an infinite-distance object to a shortest-distance object. The other lens units are immovable at focusing.

Sixth Embodiment

Figure 11:
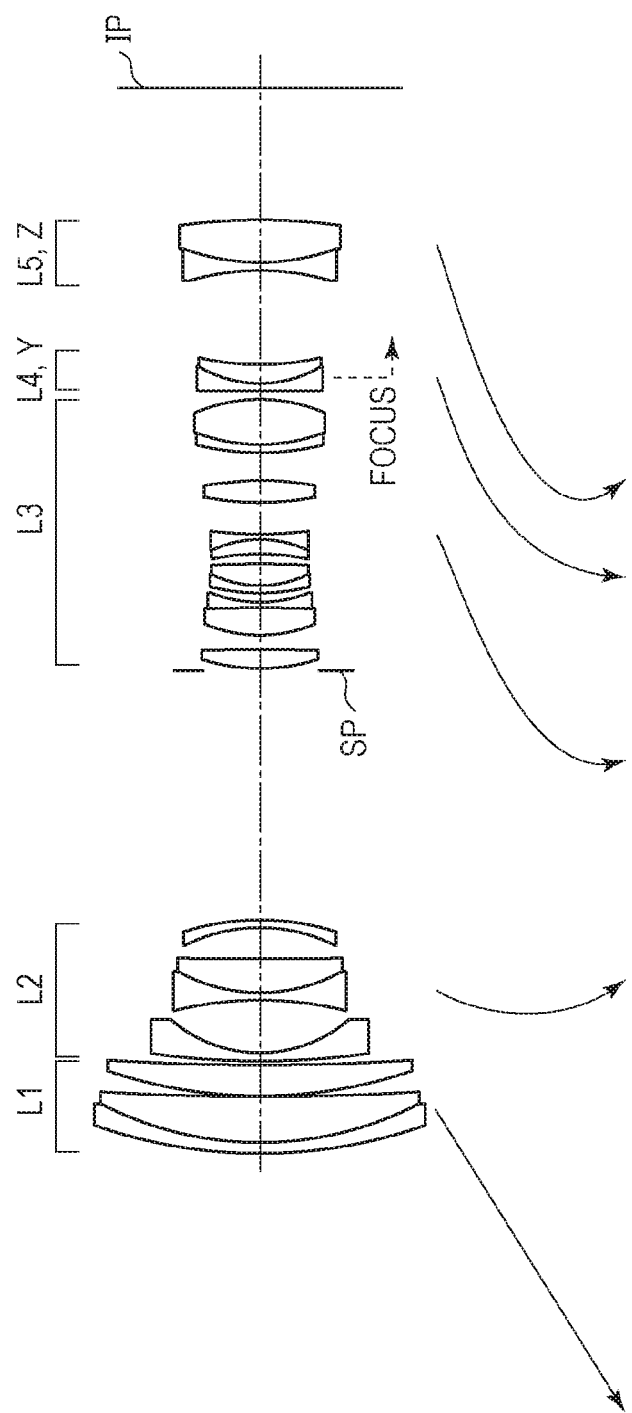
FIG. 11 is a sectional view of a zoom lens according to a sixth embodiment.

FIG. 11 is a sectional view of a zoom lens ZL according to a sixth embodiment, at the wide-angle end at focusing on an object at infinity. FIGS. 12A to 12C are aberration diagrams of the zoom lens ZL according to the sixth embodiment, at focusing on the object at infinity. FIG. 12A illustrates aberrations at the wide-angle end. FIG. 12B illustrates aberrations at an intermediate zooming position. FIG. 12C illustrates aberrations at the telephoto end.

The zoom lens ZL according to the sixth embodiment includes a first lens unit L1 having positive refractive power, a second lens unit L2 having negative refractive power, a third lens unit L3 having positive refractive power, a fourth lens unit L4 having negative refractive power, and a fifth lens unit L5 having negative refractive power. The fourth lens unit L4 corresponds to the above N-1-th lens unit Y, and the fifth lens unit L5 corresponds to the above N-th lens unit Z. The third lens unit L3 has an aperture stop SP. In each zoom lens ZL, each lens unit moves at zooming, so that the interval between adjacent lens units varies. According to the present embodiment, the lens units move differently in trajectory.

The fourth lens unit L4 and the fifth lens unit L5 each have one cemented lens. Each cemented lens includes one positive lens and one negative lens.

In the zoom lens ZL according to the sixth embodiment, the fourth lens unit L4 moves to the image side at focusing from an infinite-distance object to a shortest-distance object. The other lens units are immovable at focusing.

NUMERICAL EXAMPLES

Numerical Examples 1 to 6 corresponding to the first to sixth embodiments are indicated below. In Numerical Examples 1 to 6, surface number indicates the order of optical surfaces from the object side. r indicates the radius of curvature (mm) of each optical surface, d indicates the interval (mm) between adjacent optical surfaces, nd indicates the refractive index of the material of each optical member at the d-line, and vd indicates the Abbe number of the material of each optical member based on the d-line. The definition of the Abbe number has been described above. BF indicates the back focus.

For an aspherical surface, the surface number is denoted with an asterisk (*) in each numerical example. An aspherical shape is expressed by the following equation:

$$X = \frac{H^2/R}{1+\sqrt{1-(1+K)(H/R)^2}} + A4 \cdot H^4 + A6 \cdot H^6 + A8 \cdot H^8 + A10 \cdot H^{10} + A12 \cdot H^{12} \quad \text{[Mathematical Formula 1]}$$

where X represents an axis in the direction of the optical axis, H represents an axis perpendicular to the optical axis, the travel direction of light is plus, R represents the paraxial radius of curvature, K represents the conic constant, A4, A6, A8, A10, and A12 each are an aspherical coefficient, and "e±x" of each aspherical coefficient means $10^{\pm x}$.

Table 1 indicates values corresponding to the inequalities (1) to (5) in Numerical Examples 1 to 6.

(Numerical Example 1)
Unit (mm)

Surface data

| Surface number | r | d | nd | vd | Effective aperture |
|---|---|---|---|---|---|
| 1 | 159.512 | 1.90 | 1.95375 | 32.3 | 59.01 |
| 2 | 94.783 | 7.64 | 1.49700 | 81.5 | 58.04 |
| 3 | −280.281 | 0.15 | | | 57.80 |
| 4 | 74.183 | 5.04 | 1.49700 | 81.5 | 55.47 |
| 5 | 210.431 | (variable) | | | 54.77 |
| 6 | 209.593 | 1.48 | 1.83481 | 42.7 | 33.71 |
| 7 | 22.877 | 5.59 | | | 27.22 |
| 8 | −103.251 | 1.15 | 1.77250 | 49.6 | 26.99 |
| 9 | 35.973 | 1.91 | 2.00069 | 25.5 | 25.26 |
| 10 | 51.242 | 0.20 | | | 24.76 |
| 11 | 35.923 | 4.14 | 1.85478 | 24.8 | 24.45 |
| 12 | −149.524 | 1.49 | | | 23.63 |
| 13 | −40.545 | 1.05 | 1.80400 | 46.6 | 23.29 |
| 14 | 2715.531 | (variable) | | | 22.45 |
| 15(stop) | ∞ | 0.20 | | | 19.96 |
| 16 | 61.579 | 2.82 | 1.83481 | 42.7 | 20.41 |
| 17 | −93.492 | 0.15 | | | 20.51 |
| 18 | 37.023 | 4.69 | 1.49700 | 81.5 | 20.40 |
| 19 | −30.400 | 0.85 | 2.00100 | 29.1 | 20.05 |
| 20 | −83.562 | 1.00 | | | 20.07 |
| 21 | −511.216 | 0.86 | 2.00100 | 29.1 | 19.74 |
| 22 | 54.812 | 2.20 | | | 19.57 |
| 23 | −44.042 | 0.80 | 1.48749 | 70.2 | 19.61 |
| 24 | 44.611 | 2.79 | 2.00069 | 25.5 | 20.46 |
| 25 | −607.875 | (variable) | | | 20.58 |
| 26* | 38.604 | 5.22 | 1.58313 | 59.4 | 21.62 |
| 27* | −38.617 | 0.18 | | | 22.18 |
| 28 | −1125.480 | 1.00 | 2.00069 | 25.5 | 22.35 |
| 29 | 40.393 | 6.90 | 1.48749 | 70.2 | 22.52 |
| 30 | −30.465 | (variable) | | | 23.39 |
| 31 | 66.593 | 2.37 | 1.89286 | 20.4 | 23.99 |
| 32 | 560.562 | 0.90 | 1.83481 | 42.7 | 23.78 |
| 33 | 28.225 | (variable) | | | 23.28 |
| 34 | −40.778 | 1.11 | 1.91082 | 35.3 | 25.35 |
| 35 | 362.635 | 3.46 | 1.78472 | 25.7 | 27.32 |
| 36 | −56.995 | (variable) | | | 28.22 |
| Image plane | ∞ | | | | |

Aspherical surface data

26th surface

K = 0.00000e+000 A 4 = −1.21184e−005 A 6 = 9.60901e−009
A 8 = 1.00214e−010 A10 = −1.03515e−012 A12 = 3.97208e−015

27th surface

K = 0.00000e+000 A 4 = 1.23845e−005 A 6 = −1.68216e−009
A 8 = 6.82894e−011 A10 = −7.71348e−013 A12 = 3.45382e−015

Various types of data
Zoom ratio 10.92

| | Wide angle | Intermediate | Telephoto |
|---|---|---|---|
| Focal length | 24.72 | 88.33 | 270.00 |
| F-number | 4.12 | 5.40 | 6.49 |
| Half angle of view (°) | 38.69 | 13.76 | 4.58 |
| Image height | 19.80 | 21.64 | 21.64 |
| Overall lens length | 144.13 | 194.09 | 243.52 |
| BF | 13.50 | 51.00 | 73.50 |
| d 5 | 0.78 | 37.66 | 77.11 |
| d14 | 27.67 | 12.40 | 3.24 |
| d25 | 13.55 | 4.40 | 1.03 |
| d30 | 10.82 | 5.26 | 2.06 |
| d33 | 8.56 | 14.11 | 17.31 |
| d36 | 13.50 | 51.00 | 73.50 |
| Position of entrance pupil | 32.23 | 103.25 | 304.07 |
| Position of exit pupil | −44.09 | −36.88 | −35.26 |
| Position of front principal point | 46.34 | 102.80 | −96.24 |
| Position of rear principal point | −11.22 | −37.33 | −196.50 |

Zoom lens unit data

| Unit | Starting surface | Focal length | Lens configuration length | Position of front principal point | Position of rear principal point |
|---|---|---|---|---|---|
| 1 | 1 | 136.97 | 14.74 | 3.52 | −6.10 |
| 2 | 6 | −21.04 | 17.01 | 3.66 | −7.76 |
| 3 | 15 | 60.91 | 16.38 | −4.79 | −14.96 |
| 4 | 26 | 32.86 | 13.29 | 4.41 | −4.84 |
| 5 | 31 | −64.18 | 3.27 | 3.32 | 1.50 |
| 6 | 34 | −122.92 | 4.57 | −4.24 | −7.00 |

Single lens data

| Lens | Starting surface | Focal length |
|---|---|---|
| 1 | 1 | −248.46 |
| 2 | 2 | 143.49 |
| 3 | 4 | 227.73 |
| 4 | 6 | −30.87 |
| 5 | 8 | −34.41 |
| 6 | 9 | 113.54 |
| 7 | 11 | 34.24 |
| 8 | 13 | −49.68 |
| 9 | 16 | 44.84 |
| 10 | 18 | 34.38 |
| 11 | 19 | −48.12 |
| 12 | 21 | −49.42 |
| 13 | 23 | −45.33 |
| 14 | 24 | 41.62 |
| 15 | 26 | 33.95 |
| 16 | 28 | −38.95 |
| 17 | 29 | 36.80 |
| 18 | 31 | 84.45 |
| 19 | 32 | −35.63 |
| 20 | 34 | −40.19 |
| 21 | 35 | 62.99 |

(Numerical Example 2)
Unit (mm)

Surface data

| Surface number | r | d | nd | vd | Effective aperture |
|---|---|---|---|---|---|
| 1 | 131.399 | 1.85 | 1.90366 | 31.3 | 56.83 |
| 2 | 68.561 | 8.49 | 1.49700 | 81.5 | 55.44 |
| 3 | −730.653 | 0.15 | | | 55.12 |
| 4 | 68.792 | 6.48 | 1.61800 | 63.4 | 53.52 |
| 5 | 664.437 | (variable) | | | 52.76 |
| 6 | 243.528 | 1.28 | 1.85150 | 40.8 | 27.59 |
| 7 | 20.583 | 4.73 | | | 22.38 |
| 8 | −56.381 | 1.09 | 1.85150 | 40.8 | 21.97 |
| 9 | 45.818 | 0.46 | | | 20.78 |
| 10 | 35.871 | 4.51 | 1.92286 | 20.9 | 20.58 |
| 11 | −61.247 | 0.84 | | | 19.64 |
| 12 | −32.368 | 1.03 | 1.77250 | 49.6 | 19.45 |
| 13 | 821.472 | (variable) | | | 18.64 |
| 14(stop) | ∞ | 0.35 | | | 16.32 |
| 15 | 27.034 | 3.05 | 1.76182 | 26.5 | 17.03 |
| 16 | −852.680 | 0.15 | | | 16.92 |
| 17 | 19.840 | 3.53 | 1.58144 | 40.8 | 16.65 |
| 18 | ∞ | 0.82 | 2.00100 | 29.1 | 15.95 |
| 19 | 20.522 | 2.70 | | | 15.21 |
| 20 | 35.803 | 0.80 | 2.00069 | 25.5 | 15.50 |
| 21 | 18.888 | 3.99 | 1.72000 | 43.7 | 15.26 |
| 22 | −63.451 | 2.27 | | | 15.19 |

(Numerical Example 2)
Unit (mm)

| | | | | | |
|---|---|---|---|---|---|
| 23 | −26.036 | 0.80 | 2.00100 | 29.1 | 14.80 |
| 24 | −164.761 | (variable) | | | 15.10 |
| 25* | 45.628 | 2.42 | 1.53110 | 55.9 | 21.58 |
| 26* | 246.555 | 0.90 | | | 22.57 |
| 27 | −170.519 | 1.25 | 1.85478 | 24.8 | 22.75 |
| 28 | 170.589 | 5.53 | 1.59282 | 68.6 | 23.82 |
| 29 | −26.647 | 0.15 | | | 25.08 |
| 30 | 45.538 | 6.19 | 1.49700 | 81.5 | 27.28 |
| 31 | −45.788 | (variable) | | | 27.38 |
| 32 | 93.245 | 1.81 | 1.80518 | 25.4 | 25.57 |
| 33 | 304.630 | 1.10 | 1.63854 | 55.4 | 25.27 |
| 34 | 23.508 | (variable) | | | 24.12 |
| 35 | −53.590 | 1.28 | 1.83481 | 42.7 | 27.19 |
| 36 | 53.854 | 4.88 | 1.84666 | 23.8 | 29.26 |
| 37 | −109.597 | (variable) | | | 30.00 |
| Image plane | ∞ | | | | |

Aspherical surface data

25th surface

K = 0.00000e+000 A 4 = −3.69428e−006 A 6 = −1.81514e−007
A 8 = 1.12707e−009 A10 = −1.37724e−011 A12 = 4.19334e−014

26th surface

K = 0.00000e+000 A 4 = 2.68822e−005 A 6 = −1.85641e−007
A 8 = 9.59349e−010 A10 = −1.18429e−011 A12 = 3.67346e−014

Various types of data
Zoom ratio 9.42

| | Wide angle | Intermediate | Telephoto |
|---|---|---|---|
| Focal length | 24.72 | 85.00 | 232.80 |
| F-number | 4.12 | 5.66 | 6.41 |
| Half angle of view (°) | 37.55 | 14.28 | 5.31 |
| Image height | 19.00 | 21.64 | 21.64 |
| Overall lens length | 142.00 | 183.82 | 214.00 |
| BF | 15.78 | 45.06 | 57.20 |
| d 5 | 1.34 | 32.74 | 59.28 |
| d13 | 22.25 | 8.64 | 2.35 |
| d24 | 8.46 | 3.21 | 1.00 |
| d31 | 3.73 | 4.64 | 1.50 |
| d34 | 15.54 | 14.63 | 17.77 |
| d37 | 15.78 | 45.06 | 57.20 |
| Position of entrance pupil | 30.57 | 98.84 | 259.37 |
| Position of exit pupil | −58.97 | −44.91 | −42.49 |
| Position of front principal point | 47.11 | 103.54 | −51.47 |
| Position of rear principal point | −8.94 | −39.94 | −175.60 |

Zoom lens unit data

| Unit | Starting surface | Focal length | Lens configuration length | Position of front principal point | Position of rear principal point |
|---|---|---|---|---|---|
| 1 | 1 | 103.63 | 16.97 | 5.21 | −5.67 |
| 2 | 6 | −16.74 | 13.94 | 2.74 | −6.83 |
| 3 | 14 | 60.67 | 18.47 | −20.76 | −25.35 |
| 4 | 25 | 22.87 | 16.44 | 7.17 | −4.32 |
| 5 | 32 | −53.51 | 2.91 | 2.47 | 0.75 |
| 6 | 35 | −138.27 | 6.16 | −3.59 | −7.12 |

Single lens data

| Lens | Starting surface | Focal length |
|---|---|---|
| 1 | 1 | −160.90 |
| 2 | 2 | 126.56 |
| 3 | 4 | 123.65 |
| 4 | 6 | −26.47 |
| 5 | 8 | −29.54 |
| 6 | 10 | 25.07 |
| 7 | 12 | −40.29 |
| 8 | 15 | 34.45 |
| 9 | 17 | 34.12 |

(Numerical Example 2)
Unit (mm)

| 10 | 18 | −20.50 |
|---|---|---|
| 11 | 20 | −40.92 |
| 12 | 21 | 20.63 |
| 13 | 23 | −30.98 |
| 14 | 25 | 104.98 |
| 15 | 27 | −99.60 |
| 16 | 28 | 39.29 |
| 17 | 30 | 47.00 |
| 18 | 32 | 166.25 |
| 19 | 33 | −39.95 |
| 20 | 35 | −32.00 |
| 21 | 36 | 43.24 |

(Numerical Example 3)
Unit (mm)

Surface data

| Surface number | r | d | nd | vd | Effective aperture |
|---|---|---|---|---|---|
| 1 | 169.716 | 2.00 | 1.90366 | 31.3 | 64.56 |
| 2 | 92.911 | 7.62 | 1.49700 | 81.5 | 63.38 |
| 3 | −407.317 | 0.15 | | | 63.26 |
| 4 | 76.967 | 5.97 | 1.48749 | 70.2 | 61.01 |
| 5 | 412.709 | (variable) | | | 60.63 |
| 6 | 240.416 | 1.51 | 2.00100 | 29.1 | 31.05 |
| 7 | 24.676 | 5.15 | | | 25.98 |
| 8 | −68.764 | 1.40 | 1.60311 | 60.6 | 25.76 |
| 9 | 26.617 | 5.27 | 1.92286 | 20.9 | 23.76 |
| 10 | −223.591 | 1.78 | | | 22.73 |
| 11 | −35.544 | 1.13 | 1.76385 | 48.5 | 22.45 |
| 12 | −161.627 | (variable) | | | 21.87 |
| 13(stop) | ∞ | 0.40 | | | 18.82 |
| 14 | 31.089 | 3.37 | 1.71736 | 29.5 | 19.62 |
| 15 | −196.005 | 0.20 | | | 19.54 |
| 16 | 24.797 | 3.84 | 1.59551 | 39.2 | 19.15 |
| 17 | −231.768 | 0.95 | 2.00100 | 29.1 | 18.44 |
| 18 | 25.526 | 1.68 | | | 17.61 |
| 19 | 43.467 | 0.90 | 2.00069 | 25.5 | 17.73 |
| 20 | 20.795 | 4.29 | 1.76200 | 40.1 | 17.44 |
| 21 | −81.875 | 1.84 | | | 17.35 |
| 22 | −29.622 | 1.05 | 2.00100 | 29.1 | 17.09 |
| 23 | −105.619 | (variable) | | | 17.43 |
| 24* | 45.337 | 4.43 | 1.58313 | 59.4 | 22.13 |
| 25* | −46.205 | 0.20 | | | 22.88 |
| 26 | −139.129 | 1.23 | 1.85478 | 24.8 | 23.17 |
| 27 | 286.814 | 5.70 | 1.49700 | 81.5 | 23.69 |
| 28 | −24.254 | (variable) | | | 24.43 |
| 29 | −599.361 | 3.41 | 1.84666 | 23.8 | 23.98 |
| 30 | −73.676 | 1.00 | 1.54814 | 45.8 | 23.97 |
| 31 | 28.450 | (variable) | | | 23.65 |
| 32 | −55.050 | 1.50 | 1.77250 | 49.6 | 27.86 |
| 33 | 1340.571 | 3.66 | 1.89286 | 20.4 | 29.43 |
| 34 | −108.676 | (variable) | | | 30.52 |
| Image plane | ∞ | | | | |

Aspherical surface data

24th surface

K = 0.00000e+000 A 4 = −6.42961e−006 A 6 = −3.43999e−009
A 8 = −1.14491e−010 A10 = 1.66468e−012 A12 = −2.03424e−014

25th surface

K = 0.00000e+000 A 4 = 2.17161e−005 A 6 = −4.07280e−009
A 8 = −7.05450e−011 A10 = 1.39799e−012 A12 = −1.84311e−014

(Numerical Example 3)
Unit (mm)

Various types of data
Zoom ratio 10.92

|  | Wide angle | Intermediate | Telephoto |
|---|---|---|---|
| Focal length | 24.72 | 85.00 | 270.00 |
| F-number | 4.12 | 5.66 | 6.40 |
| Half angle of view (°) | 37.25 | 14.28 | 4.58 |
| Image height | 18.80 | 21.64 | 21.64 |
| Overall lens length | 146.52 | 194.29 | 244.52 |
| BF | 12.42 | 44.64 | 65.40 |
| d 5 | 1.05 | 40.47 | 80.95 |
| d12 | 27.43 | 11.40 | 2.92 |
| d23 | 12.25 | 4.41 | 1.89 |
| d28 | 7.38 | 5.86 | 1.50 |
| d31 | 14.36 | 15.88 | 20.25 |
| d34 | 12.42 | 44.64 | 65.40 |
| Position of entrance pupil | 32.03 | 109.71 | 340.60 |
| Position of exit pupil | −56.02 | −43.11 | −41.97 |
| Position of front principal point | 47.82 | 112.37 | −68.38 |
| Position of rear principal point | −12.30 | −40.36 | −204.60 |

Zoom lens unit data

| Unit | Starting surface | Focal length | Lens configuration length | Position of front principal point | Position of rear principal point |
|---|---|---|---|---|---|
| 1 | 1 | 136.69 | 15.74 | 4.23 | −6.12 |
| 2 | 6 | −20.35 | 16.24 | 3.00 | −8.03 |
| 3 | 13 | 61.58 | 18.50 | −15.04 | −22.20 |
| 4 | 24 | 27.82 | 11.56 | 4.57 | −3.40 |
| 5 | 29 | −60.12 | 4.41 | 2.43 | −0.05 |
| 6 | 32 | −184.96 | 5.16 | −4.24 | −7.19 |

Single lens data

| Lens | Starting surface | Focal length |
|---|---|---|
| 1 | 1 | −230.03 |
| 2 | 2 | 152.99 |
| 3 | 4 | 192.95 |
| 4 | 6 | −27.57 |
| 5 | 8 | −31.64 |
| 6 | 9 | 26.04 |
| 7 | 11 | −59.88 |
| 8 | 14 | 37.64 |
| 9 | 16 | 37.83 |
| 10 | 17 | −22.93 |
| 11 | 19 | −40.65 |
| 12 | 20 | 22.16 |
| 13 | 22 | −41.41 |
| 14 | 24 | 39.96 |
| 15 | 26 | −109.45 |
| 16 | 27 | 45.27 |
| 17 | 29 | 98.92 |
| 18 | 30 | −37.31 |
| 19 | 32 | −68.42 |
| 20 | 33 | 112.72 |

(Numerical Example 4)
Unit (mm)

Surface data

| Surface number | r | d | nd | vd | Effective aperture |
|---|---|---|---|---|---|
| 1 | 160.221 | 1.90 | 1.95375 | 32.3 | 58.60 |
| 2 | 93.202 | 7.24 | 1.49700 | 81.5 | 57.62 |
| 3 | −355.244 | 0.15 |  |  | 57.41 |
| 4 | 67.493 | 5.57 | 1.49700 | 81.5 | 55.24 |
| 5 | 207.841 | (variable) |  |  | 54.52 |
| 6 | 263.549 | 1.27 | 1.83481 | 42.7 | 30.06 |
| 7 | 22.022 | 4.85 |  |  | 25.06 |
| 8 | −107.080 | 1.15 | 1.77250 | 49.6 | 24.89 |
| 9 | 34.045 | 2.35 | 2.00069 | 25.5 | 23.63 |
| 10 | 72.851 | 0.20 |  |  | 23.21 |
| 11 | 35.458 | 3.47 | 1.85478 | 24.8 | 22.75 |
| 12 | −679.829 | 1.93 |  |  | 21.96 |
| 13 | −43.270 | 1.05 | 1.80400 | 46.6 | 21.17 |
| 14 | 195.764 | (variable) |  |  | 20.42 |
| 15(stop) | ∞ | 0.20 |  |  | 19.45 |
| 16 | 69.306 | 2.80 | 1.83481 | 42.7 | 19.86 |
| 17 | −74.038 | 0.15 |  |  | 20.01 |
| 18 | 31.940 | 4.60 | 1.49700 | 81.5 | 19.92 |
| 19 | −33.745 | 0.85 | 2.00100 | 29.1 | 19.55 |
| 20 | −99.038 | 1.00 |  |  | 19.51 |
| 21 | 867.877 | 0.80 | 2.00100 | 29.1 | 19.14 |
| 22 | 49.128 | 2.28 |  |  | 18.92 |
| 23 | −39.363 | 0.80 | 1.48749 | 70.2 | 18.95 |
| 24 | 43.763 | 2.65 | 2.00069 | 25.5 | 19.71 |
| 25 | −3496.878 | (variable) |  |  | 19.80 |
| 26* | 37.033 | 5.49 | 1.58313 | 59.4 | 23.42 |
| 27* | −34.575 | 0.16 |  |  | 23.74 |
| 28 | −257.276 | 1.24 | 2.00069 | 25.5 | 23.70 |
| 29 | 42.403 | 6.48 | 1.48749 | 70.2 | 23.80 |
| 30 | −29.489 | (variable) |  |  | 24.34 |
| 31 | 115.205 | 2.12 | 1.89286 | 20.4 | 23.83 |
| 32 | −2834.309 | 0.90 | 1.83481 | 42.7 | 23.64 |
| 33 | 41.143 | (variable) |  |  | 23.29 |
| 34 | −62.297 | 1.50 | 1.91082 | 35.3 | 26.17 |
| 35 | 28.301 | 7.93 | 1.78472 | 25.7 | 28.43 |
| 36 | −137.170 | (variable) |  |  | 29.95 |
| Image plane | ∞ |  |  |  |  |

Aspherical surface data

26th surface

K = 0.00000e+000 A 4 = −1.26782e−005 A 6 = 5.43225e−010
A 8 = 2.59098e−010 A10 = −1.99055e−012 A12 = 7.81368e−015

27th surface

K = 0.00000e+000 A 4 = 1.58893e−005 A 6 = −1.36496e−008
A 8 = 2.24824e−010 A10 = −1.69414e−012 A12 = 7.40113e−015

Various types of data
Zoom ratio 9.64

|  | Wide angle | Intermediate | Telephoto |
|---|---|---|---|
| Focal length | 27.99 | 90.00 | 270.00 |
| F-number | 4.12 | 5.40 | 6.49 |
| Half angle of view (°) | 35.27 | 13.52 | 4.58 |
| Image height | 19.80 | 21.64 | 21.64 |
| Overall lens length | 144.03 | 190.80 | 235.98 |
| BF | 13.41 | 44.92 | 62.97 |
| d 5 | 1.13 | 37.33 | 75.91 |
| d14 | 25.10 | 11.71 | 3.08 |
| d25 | 11.37 | 3.81 | 1.00 |
| d30 | 5.53 | 4.11 | 1.51 |
| d33 | 14.42 | 15.83 | 18.43 |
| d36 | 13.41 | 44.92 | 62.97 |
| Position of entrance pupil | 31.76 | 102.67 | 304.20 |
| Position of exit pupil | −42.49 | −36.18 | −34.72 |
| Position of front principal point | 45.73 | 92.80 | −172.06 |
| Position of rear principal point | −14.58 | −45.08 | −207.03 |

Zoom lens unit data

| Unit | Starting surface | Focal length | Lens configuration length | Position of front principal point | Position of rear principal point |
|---|---|---|---|---|---|
| 1 | 1 | 133.93 | 14.85 | 3.30 | −6.38 |
| 2 | 6 | −19.77 | 16.27 | 3.73 | −6.96 |
| 3 | 15 | 54.56 | 16.13 | −4.89 | −14.73 |
| 4 | 26 | 32.35 | 13.36 | 4.38 | −4.87 |

(Numerical Example 4)
Unit (mm)

| 5 | 31 | −81.53 | 3.02 | 2.66 | 1.02 |
| 6 | 34 | −77.79 | 9.43 | −2.06 | −7.51 |

Single lens data

| Lens | Starting surface | Focal length |
|---|---|---|
| 1 | 1 | −236.90 |
| 2 | 2 | 149.35 |
| 3 | 4 | 198.50 |
| 4 | 6 | −28.85 |
| 5 | 8 | −33.32 |
| 6 | 9 | 61.99 |
| 7 | 11 | 39.51 |
| 8 | 13 | −43.99 |
| 9 | 16 | 43.27 |
| 10 | 18 | 33.80 |
| 11 | 19 | −51.47 |
| 12 | 21 | −52.05 |
| 13 | 23 | −42.38 |
| 14 | 24 | 43.21 |
| 15 | 26 | 31.55 |
| 16 | 28 | −36.30 |
| 17 | 29 | 36.76 |
| 18 | 31 | 124.03 |
| 19 | 32 | −48.57 |
| 20 | 34 | −21.20 |
| 21 | 35 | 30.54 |

(Numerical Example 5)
Unit (mm)

Surface data

| Surface number | r | d | nd | vd | Effective aperture |
|---|---|---|---|---|---|
| 1 | 106.913 | 2.00 | 1.90366 | 31.3 | 54.26 |
| 2 | 70.021 | 6.89 | 1.49700 | 81.5 | 52.98 |
| 3 | 575.047 | 0.15 | | | 52.47 |
| 4 | 70.651 | 6.60 | 1.49700 | 81.5 | 51.21 |
| 5 | 843.740 | (variable) | | | 50.24 |
| 6 | 8705.783 | 1.50 | 1.85150 | 40.8 | 29.28 |
| 7 | 26.703 | 4.09 | | | 24.88 |
| 8 | −100.451 | 1.40 | 1.53775 | 74.7 | 24.65 |
| 9 | 29.309 | 3.67 | 1.89286 | 20.4 | 22.68 |
| 10 | 582.228 | 1.45 | | | 21.91 |
| 11 | −52.899 | 1.20 | 1.83481 | 42.7 | 21.68 |
| 12 | 236.369 | (variable) | | | 20.95 |
| 13(stop) | ∞ | 0.40 | | | 16.39 |
| 14 | 37.292 | 3.13 | 1.58144 | 40.8 | 16.92 |
| 15 | −91.960 | 0.20 | | | 17.03 |
| 16 | 29.474 | 4.52 | 1.60342 | 38.0 | 17.02 |
| 17 | −74.475 | 1.00 | 1.95375 | 32.3 | 16.38 |
| 18 | 36.941 | 1.17 | | | 16.04 |
| 19 | 43.325 | 1.00 | 2.00100 | 29.1 | 16.18 |
| 20 | 22.233 | 3.81 | 1.71700 | 47.9 | 15.98 |
| 21 | −84.570 | (variable) | | | 15.95 |
| 22 | −25.413 | 3.04 | 1.91650 | 31.6 | 15.93 |
| 23 | −14.050 | 1.00 | 1.80100 | 35.0 | 16.32 |
| 24 | −103.258 | (variable) | | | 16.83 |
| 25* | 47.545 | 4.96 | 1.58313 | 59.4 | 24.78 |
| 26* | −40.360 | 1.21 | | | 25.00 |
| 27 | 250.856 | 1.50 | 1.85478 | 24.8 | 25.63 |
| 28 | 55.271 | 9.97 | 1.43875 | 94.7 | 25.85 |
| 29 | −25.459 | (variable) | | | 26.99 |
| 30 | 280.001 | 3.49 | 2.00069 | 25.5 | 24.85 |
| 31 | −44.623 | 1.35 | 1.89190 | 37.1 | 24.65 |
| 32 | 35.472 | (variable) | | | 23.73 |
| 33 | −27.708 | 1.50 | 1.91650 | 31.6 | 24.77 |
| 34 | 200.098 | 6.32 | 1.89286 | 20.4 | 27.81 |
| 35 | −44.441 | (variable) | | | 29.87 |
| Image plane | ∞ | | | | |

Aspherical surface data

25th surface

K = 0.00000e+000 A 4 = −2.52096e−006 A 6 = 5.38839e−008
A 8 = 6.58401e−011 A10 = −8.44353e−014 A12 = 4.00412e−015

26th surface

K = 0.00000e+000 A 4 = 2.22129e−005 A 6 = 5.42206e−008
A 8 = 1.23891e−010 A10 = −3.37779e−013 A12 = 5.84579e−015

Various types of data
Zoom ratio 7.86

| | Wide angle | Intermediate | Telephoto |
|---|---|---|---|
| Focal length | 28.00 | 70.00 | 220.00 |
| F-number | 4.12 | 5.40 | 6.49 |
| Half angle of view (°) | 34.16 | 17.18 | 5.62 |
| Image height | 19.00 | 21.64 | 21.64 |
| Overall lens length | 145.16 | 174.63 | 213.85 |
| BF | 11.20 | 28.85 | 39.65 |
| d 5 | 1.09 | 27.25 | 63.65 |
| d12 | 23.90 | 12.01 | 2.84 |
| d21 | 3.36 | 3.25 | 1.00 |
| d24 | 11.36 | 5.48 | 1.00 |
| d29 | 7.30 | 5.43 | 1.50 |
| d32 | 8.43 | 13.83 | 25.68 |
| d35 | 11.20 | 28.85 | 39.65 |
| Position of entrance pupil | 32.65 | 80.57 | 238.10 |
| Position of exit pupil | −52.34 | −45.89 | −45.18 |
| Position of front principal point | 48.31 | 85.02 | −112.49 |
| Position of rear principal point | −16.80 | −41.14 | −180.35 |

Zoom lens unit data

| Unit | Starting surface | Focal length | Lens configuration length | Position of front principal point | Position of rear principal point |
|---|---|---|---|---|---|
| 1 | 1 | 122.26 | 15.65 | 2.94 | −7.35 |
| 2 | 6 | −20.09 | 13.32 | 3.51 | −5.57 |
| 3 | 13 | 32.33 | 15.22 | 1.65 | −8.48 |
| 4 | 22 | −52.48 | 4.04 | −1.55 | −3.80 |
| 5 | 25 | 28.22 | 17.64 | 6.37 | −7.05 |
| 6 | 30 | −52.96 | 4.84 | 3.04 | 0.56 |
| 7 | 33 | −96.52 | 7.82 | −7.98 | −13.20 |

Single lens data

| Lens | Starting surface | Focal length |
|---|---|---|
| 1 | 1 | −230.49 |
| 2 | 2 | 159.70 |
| 3 | 4 | 154.71 |
| 4 | 6 | −31.46 |
| 5 | 8 | −42.03 |
| 6 | 9 | 34.46 |
| 7 | 11 | −51.68 |
| 8 | 14 | 46.04 |
| 9 | 16 | 35.58 |
| 10 | 17 | −25.78 |
| 11 | 19 | −46.73 |
| 12 | 20 | 24.92 |
| 13 | 22 | 30.40 |
| 14 | 23 | −20.40 |
| 15 | 25 | 38.23 |
| 16 | 27 | −83.23 |
| 17 | 28 | 41.28 |
| 18 | 30 | 38.67 |
| 19 | 31 | −21.98 |

(Numerical Example 5)
Unit (mm)

| | | |
|---|---|---|
| 20 | 33 | −26.47 |
| 21 | 34 | 41.23 |

(Numerical Example 6)
Unit (mm)

Surface data

| Surface number | r | d | nd | vd | Effective aperture |
|---|---|---|---|---|---|
| 1 | 90.867 | 2.00 | 1.71736 | 29.5 | 60.17 |
| 2 | 62.763 | 8.37 | 1.49700 | 81.5 | 57.92 |
| 3 | 467.133 | 0.15 | | | 57.19 |
| 4 | 86.446 | 5.63 | 1.49700 | 81.5 | 55.46 |
| 5 | 424.221 | (variable) | | | 54.44 |
| 6 | 144.563 | 1.50 | 2.00100 | 29.1 | 39.47 |
| 7 | 24.700 | 9.62 | | | 32.44 |
| 8 | −65.187 | 1.40 | 1.53775 | 74.7 | 31.42 |
| 9 | 30.870 | 6.20 | 1.89286 | 20.4 | 29.95 |
| 10 | 1140.221 | 5.68 | | | 29.07 |
| 11 | −30.415 | 1.41 | 1.83400 | 37.2 | 27.46 |
| 12 | −45.389 | (variable) | | | 27.79 |
| 13(stop) | ∞ | 0.40 | | | 20.58 |
| 14 | 34.405 | 3.42 | 1.65412 | 39.7 | 21.05 |
| 15 | −520.001 | 2.70 | | | 20.86 |
| 16 | 25.984 | 5.01 | 1.64769 | 33.8 | 19.93 |
| 17 | −224.877 | 1.00 | 1.95375 | 32.3 | 18.81 |
| 18 | 24.176 | 1.70 | | | 17.88 |
| 19 | 36.975 | 1.35 | 1.95375 | 32.3 | 18.02 |
| 20 | 20.024 | 3.98 | 1.69350 | 50.8 | 17.61 |
| 21 | −191.700 | 1.80 | | | 17.50 |
| 22 | −41.708 | 2.65 | 1.83400 | 37.2 | 17.32 |
| 23 | −20.186 | 1.00 | 1.74951 | 35.3 | 17.48 |
| 24 | 74.292 | 5.84 | | | 17.70 |
| 25* | 74.841 | 4.00 | 1.58313 | 59.4 | 19.43 |
| 26* | −48.467 | 5.06 | | | 20.31 |
| 27 | 47.804 | 1.50 | 1.90366 | 31.3 | 23.16 |
| 28 | 32.620 | 8.25 | 1.49700 | 81.5 | 23.06 |
| 29 | −29.760 | (variable) | | | 23.63 |
| 30 | 1233.213 | 1.35 | 1.91082 | 35.3 | 22.80 |
| 31 | 21.631 | 3.44 | 1.85478 | 24.8 | 22.29 |
| 32 | 49.918 | (variable) | | | 22.16 |
| 33 | −45.110 | 1.50 | 1.78590 | 44.2 | 25.53 |
| 34 | 39.910 | 7.77 | 1.91082 | 35.3 | 27.82 |
| 35 | −105.846 | (variable) | | | 29.13 |
| Image plane | ∞ | | | | |

Aspherical surface data

25th surface

K = 0.00000e+000 A 4 = −3.59578e−006 A 6 = 1.91992e−008
A 8 = −1.52359e−010 A10 = 1.52529e−012 A12 = −3.30375e−015

26th surface

K = 0.00000e+000 A 4 = 9.68797e−006 A 6 = 2.15863e−008
A 8 = 3.33224e−012 A10 = 3.37236e−014 A12 = 2.13975e−015

Various types of data
Zoom ratio 6.16

| | Wide angle | Intermediate | Telephoto |
|---|---|---|---|
| Focal length | 29.24 | 75.66 | 180.00 |
| F-number | 4.00 | 5.60 | 7.10 |
| Half angle of view (°) | 33.02 | 15.96 | 6.85 |
| Image height | 19.00 | 21.64 | 21.64 |
| Overall lens length | 195.00 | 221.93 | 250.55 |
| BF | 24.16 | 64.25 | 67.25 |
| d 5 | 0.75 | 23.41 | 58.25 |
| d12 | 45.62 | 16.35 | 2.35 |
| d29 | 1.58 | 4.94 | 6.38 |

(Numerical Example 6)
Unit (mm)

| | | | |
|---|---|---|---|
| d32 | 17.20 | 7.30 | 10.64 |
| d35 | 24.16 | 64.25 | 67.25 |
| Position of entrance pupil | 41.03 | 82.06 | 222.05 |
| Position of exit pupil | −59.72 | −53.58 | −55.71 |
| Position of front principal point | 60.08 | 109.14 | 138.54 |
| Position of rear principal point | −5.07 | −11.41 | −112.75 |

Zoom lens unit data

| Unit | Starting surface | Focal length | Lens configuration length | Position of front principal point | Position of rear principal point |
|---|---|---|---|---|---|
| 1 | 1 | 127.43 | 16.16 | 2.06 | −8.67 |
| 2 | 6 | −23.05 | 25.82 | 3.68 | −15.60 |
| 3 | 13 | 38.04 | 49.65 | 36.70 | −27.38 |
| 4 | 30 | −52.56 | 4.79 | 2.41 | −0.15 |
| 5 | 33 | −199.34 | 9.27 | −8.92 | −14.46 |

Single lens data

| Lens | Starting surface | Focal length |
|---|---|---|
| 1 | 1 | −291.55 |
| 2 | 2 | 144.89 |
| 3 | 4 | 217.25 |
| 4 | 6 | −29.95 |
| 5 | 8 | −38.76 |
| 6 | 9 | 35.44 |
| 7 | 11 | −115.50 |
| 8 | 14 | 49.45 |
| 9 | 16 | 36.25 |
| 10 | 17 | −22.84 |
| 11 | 19 | −47.65 |
| 12 | 20 | 26.35 |
| 13 | 22 | 44.41 |
| 14 | 23 | −21.08 |
| 15 | 25 | 51.06 |
| 16 | 27 | −119.24 |
| 17 | 28 | 32.75 |
| 18 | 30 | −24.19 |
| 19 | 31 | 42.28 |
| 20 | 33 | −26.74 |
| 21 | 34 | 32.65 |

TABLE 1

| | Numerical examples | | | | | |
|---|---|---|---|---|---|---|
| | 1 | 2 | 3 | 4 | 5 | 6 |
| fw | 24.72 | 24.72 | 24.72 | 27.99 | 28.00 | 29.24 |
| skw | 13.50 | 15.78 | 12.42 | 13.41 | 11.20 | 24.16 |
| m_max | 60.00 | 41.43 | 58.86 | 49.56 | 28.45 | 36.52 |
| tdw | 130.64 | 126.22 | 134.09 | 130.62 | 133.96 | 170.84 |
| Rcem | 362.63 | 53.85 | 1340.57 | 28.30 | 200.10 | 21.63 |
| len | 16.96 | 20.66 | 16.09 | 21.34 | 17.52 | 54.08 |
| fp | 62.99 | 43.24 | 112.72 | 30.54 | 41.23 | 42.28 |
| fn | −40.19 | −32.00 | −68.42 | −21.20 | −26.47 | −24.19 |
| fy | −64.18 | −53.51 | −60.12 | −81.53 | −52.96 | −52.56 |
| fz | 122.92 | 138.27 | −184.96 | −77.79 | −96.52 | −199.34 |
| (1) len/Rcem | 0.05 | 0.38 | 0.01 | 0.75 | 0.09 | 2.50 |
| (2) m_max/tdw | 0.46 | 0.33 | 0.44 | 0.38 | 0.21 | 0.21 |
| (3) fw/skw | 1.83 | 1.57 | 1.99 | 2.09 | 2.50 | 1.21 |
| (4) fp/|fn| | 1.57 | 1.35 | 1.65 | 1.44 | 1.56 | 1.75 |
| (5) |fy/fz| | 0.52 | 0.39 | 0.33 | 1.05 | 0.55 | 0.26 |

[Image Pickup Apparatus]

Figure 14:
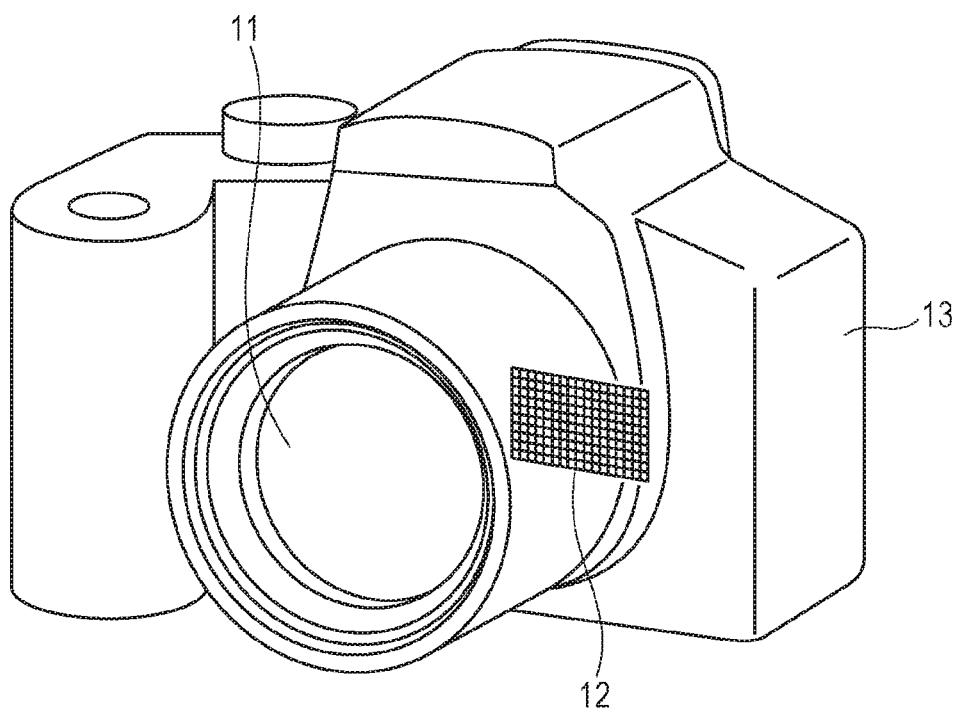
FIG. 14 is a view of the configuration of an image pickup apparatus according to an embodiment.

Next, an image pickup apparatus according to an embodiment will be described with FIG. 14. FIG. 14 illustrates the configuration of the image pickup apparatus 10. The image pickup apparatus 10 includes: a camera body 13, a lens device 11 including the zoom lens ZL according to any of the first to sixth embodiments; and a light-receiving element (image pickup element) 12 that photoelectrically converts an image formed by the zoom lens ZL. As the light-receiving element 12, an image pickup element, such as a CCD sensor or a CMOS sensor, can be used. The lens device 11 and the camera body 13 may be integrally formed, or may be detachably mountable to each other.

The image pickup apparatus 10 according to the present embodiment has a compact size, high zoom ratio, and less ghosting and high optical performance over the entire zoom range.

Note that the image pickup apparatus 10 according to the present embodiment is not limited to a digital still camera illustrated in FIG. 14, and thus can be applied to various image pickup apparatuses, such as a broadcasting camera, a silver-halide film camera, and a monitoring camera.

The exemplary embodiments of the disclosure have been described above. However, the disclosure is not limited to the embodiments, and thus various combinations, modifications, and alterations may be made without departing from the scope of the spirit of the disclosure.

For example, a lens unit that moves at focusing in the zoom lens ZL is not limited to the N-1-th lens unit Y or the N-th lens unit Z. For example, the N-1-th lens unit Y or the N-th lens unit Z may function as a main focus lens unit for focusing, and the other lens units may move infinitesimally for aberration correction.

For example, for image shake correction, a lens that is part of the zoom lens may move orthogonally to the optical axis. The zoom lens may include an optical element having no refractive power, such as a diffractive optical element.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-224122, filed Nov. 29, 2018, which is hereby incorporated by reference herein in its entirety.

What is claimed is:

1. A zoom lens comprising:
a first lens unit having positive refractive power;
a second lens unit having negative refractive power;
a third lens unit having positive refractive power;
an N-1-th lens unit disposed second closest to an image side; and
an N-th lens unit disposed closest to the image side, the first lens unit, the second lens unit, and the third lens unit being disposed in order from an object side to the image side, an interval between adjacent lens units varying at zooming, wherein
the N-1-th lens unit and the N-th lens unit each consist of one or more cemented lens including a positive lens and a negative lens, and move at zooming, and
at least one lens unit of the N-1-th lens unit and the N-th lens unit has a cemented surface satisfying the following inequality:

$$0.00 < \text{len}/R\text{cem} < 3.50$$

where $R\text{cem}$ is a radius of curvature of the cemented surface of the one or more cemented lens, and len is a length acquired by addition of a back focus to a distance on an optical axis from the cemented surface to a surface closest to the image side in the zoom lens, and the following inequalities are satisfied:

$$0.20 < m\_\text{max}/tdw < 10.00$$

$$1.20 < fw/skw < 2.60$$

where $m\_\text{max}$ is a larger amount of an amount of movement of the N-1-th lens unit and an amount of movement of the N-th lens unit at zooming from a wide-angle end to a telephoto end, $tdw$ is an overall length of the zoom lens at the wide-angle end, $fw$ is a focal length of the zoom lens at the wide-angle end, and $skw$ is the back focus of the zoom lens at the wide-angle end.

2. The zoom lens according to claim 1, wherein at least one lens unit of the N-1-th lens unit and the N-th lens unit has the cemented lens satisfying the following inequality:

$$0.50 < fp/|fn| < 2.50$$

where $fp$ is a focal length of the positive lens in the lens unit, and $fn$ is a focal length of the negative lens cemented to the positive lens.

3. The zoom lens according to claim 1, wherein at least one lens unit of the N-1-th lens unit and the N-th lens unit moves at focusing.

4. The zoom lens according to claim 3, wherein the N-1-th lens unit moves at focusing, and the following inequality is satisfied:

$$0.15 < |fy/fz| < 2.00$$

where $fy$ is a focal length of the N-1-th lens unit, and $fz$ is a focal length of the N-th lens unit.

5. The zoom lens according to claim 1, wherein at least one lens unit of the N-1-th lens unit and the N-th lens unit consist of one cemented lens.

6. The zoom lens according to claim 5, wherein the one cemented lens includes a positive lens and a negative lens.

7. The zoom lens according to claim 1, wherein at least one lens unit of the N-1-th lens unit and the N-th lens unit has negative refractive power.

8. The zoom lens according to claim 1, wherein all lenses in the second lens unit are spherical lenses.

9. The zoom lens according to claim 1, further comprising:
an aperture stop, wherein
all lenses disposed on the object side with respect to the aperture stop are spherical lenses.

10. The zoom lens according to claim 1, further comprising:
a fourth lens unit having positive refractive power;
a fifth lens unit having negative refractive power, the fifth lens unit being used as the N-1-th lens unit; and
a sixth lens unit having negative refractive power, the sixth lens unit being used as the N-th lens unit, the first lens unit, the second lens unit, the third lens unit, the fourth lens unit, the fifth lens unit, and the sixth lens unit being disposed in order from the object side to the image side.

11. The zoom lens according to claim 1, further comprising:
a fourth lens unit having negative refractive power;
a fifth lens unit having positive refractive power;
a sixth lens unit having negative refractive power, the sixth lens unit being used as the N-1-th lens unit; and
a seventh lens unit having negative refractive power, the seventh lens unit being used as the N-th lens unit, the first lens unit, the second lens unit, the third lens unit, the fourth lens unit, the fifth lens unit, the sixth lens unit, and the seventh lens unit being disposed in order from the object side to the image side.

12. The zoom lens according to claim 1, further comprising:
   a fourth lens unit having negative refractive power, the fourth lens unit being used as the N-1-th lens unit; and
   a fifth lens unit having negative refractive power, the fifth lens unit being used as the N-th lens unit, the first lens unit, the second lens unit, the third lens unit, the fourth lens unit, and the fifth lens unit being disposed in order from the object side to the image side.

13. An image pickup apparatus comprising:
   a zoom lens; and
   an image pickup element configured to receive an image formed by the zoom lens, wherein
   the zoom lens includes
   a first lens unit having positive refractive power, a second lens unit having negative refractive power, a third lens unit having positive refractive power, an N-1-th lens unit disposed second closest to an image side, and an N-th lens unit disposed closest to the image side, the first lens unit, the second lens unit, and the third lens unit being disposed in sequence from an object side to the image side,
   an interval between adjacent lens units varies at zooming,
   the N-1-th lens unit and the N-th lens unit each consist of one or more cemented lens including a positive lens and a negative lens, and move at zooming, and
   at least one lens unit of the N-1-th lens unit and the N-th lens unit satisfies the following inequalities:

$0.00 < \mathrm{len}/R\mathrm{cem} < 3.50$ where Rcem is a radius of curvature of a cemented surface of the one or more cemented lens, and len is a length acquired by addition of a back focus to a distance on an optical axis from the cemented surface to a surface closest to the image side in the zoom lens, and $0.20 < m\_\mathrm{max}/tdw < 10.00$ $1.20 < fw/skw < 2.60$ where m_max is a larger amount of an amount of movement of the N-1-th lens unit and an amount of movement of the N-th lens unit at zooming from a wide-angle end to a telephoto end, tdw is an overall length of the zoom lens at the wide-angle end, fw is a focal length of the zoom lens at the wide-angle end, and skw is the back focus of the zoom lens at the wide-angle end.

14. The image pickup apparatus according to claim 13, wherein at least one lens unit of the N-1-th lens unit and the N-th lens unit has the cemented lens satisfying the following inequality:

$0.50 < fp/|fn| < 2.50$ where fp is a focal length of the positive lens in the lens unit, and fn is a focal length of the negative lens cemented to the positive lens.

15. The image pickup apparatus according to claim 13, wherein at least one lens unit of the N-1-th lens unit and the N-th lens unit moves at focusing.

16. The image pickup apparatus according to claim 13, wherein at least one lens unit of the N-1-th lens unit and the N-th lens unit consist of one cemented lens.

17. The image pickup apparatus according to claim 13, wherein at least one lens unit of the N-1-th lens unit and the N-th lens unit has negative refractive power.

18. The image pickup apparatus according to claim 13, wherein all lenses in the second lens unit are spherical lenses.

19. The image pickup apparatus according to claim 13, wherein the zoom lens further includes an aperture stop, and
   wherein all lenses disposed on the object side with respect to the aperture stop are spherical lenses.

20. The image pickup apparatus according to claim 13, wherein the zoom lens further includes:
   a fourth lens unit having positive refractive power;
   a fifth lens unit having negative refractive power, the fifth lens unit being used as the N-1-th lens unit; and
   a sixth lens unit having negative refractive power, the sixth lens unit being used as the N-th lens unit, the first lens unit, the second lens unit, the third lens unit, the fourth lens unit, the fifth lens unit, and the sixth lens unit being disposed in order from the object side to the image side.

* * * * *